(12) United States Patent
Furuichi

(10) Patent No.: US 10,849,040 B2
(45) Date of Patent: Nov. 24, 2020

(54) BASE STATION SYSTEM, NODE APPARATUS AND METHOD THEREIN

(71) Applicant: NEC CORPORATION, Tokyo (JP)

(72) Inventor: Hideyuki Furuichi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/279,066

(22) Filed: Feb. 19, 2019

(65) Prior Publication Data

US 2019/0274081 A1    Sep. 5, 2019

(30) Foreign Application Priority Data

Mar. 5, 2018  (JP) .................................. 2018-038477

(51) Int. Cl.
| | |
|---|---|
| *H04W 36/24* | (2009.01) |
| *H04W 36/08* | (2009.01) |
| *G06F 9/455* | (2018.01) |
| *H04W 88/08* | (2009.01) |

(52) U.S. Cl.
CPC ...... *H04W 36/245* (2013.01); *G06F 9/45558* (2013.01); *H04W 36/08* (2013.01); *H04W 88/08* (2013.01); *G06F 2009/45595* (2013.01)

(58) Field of Classification Search
CPC ... H04W 36/245; H04W 88/08; H04W 36/08; G06F 9/45558; G06F 2009/45595; G06F 2009/4557; G06F 9/45533
See application file for complete search history.

(56) References Cited

U.S. PATENT DOCUMENTS

2012/0177047 A1* 7/2012 Roitshtein ............... H04L 69/22
370/392
2012/0252457 A1* 10/2012 Shindo .................. H04W 36/08
455/436

FOREIGN PATENT DOCUMENTS

JP            2013-197645 A      9/2013

\* cited by examiner

*Primary Examiner* — Jae Y Lee
(74) *Attorney, Agent, or Firm* — Sughrue Mion, PLLC

(57) ABSTRACT

To enable a wireless terminal to run an application program by using resources of other apparatuses, a base station system 1 includes a plurality of base stations 100 configured to execute assigned functions, each assigned function being a part of a plurality of functions of a virtual machine executing an application program for a wireless terminal apparatus 400. The plurality of functions of the virtual machine are distributedly executed by servers 115, 125, 135 of the plurality of base stations 100.

10 Claims, 21 Drawing Sheets

221

| TYPE (ATTACH/ DETACH/ HANDOVER) | IDENTIFICATION NUMBER OF WIRELESS TERMINAL | DATE & TIME OF OCCURRENCE | IDENTIFICATION NUMBER OF BASE STATION | IDENTIFICATION NUMBER OF HANDOVER SOURCE BASE STATION | IDENTIFICATION NUMBER OF HANDOVER TARGET BASE STATION |
|---|---|---|---|---|---|
| | | | | | |
| | | | | | |
| | | | | | |

Figure 9

Figure 10:
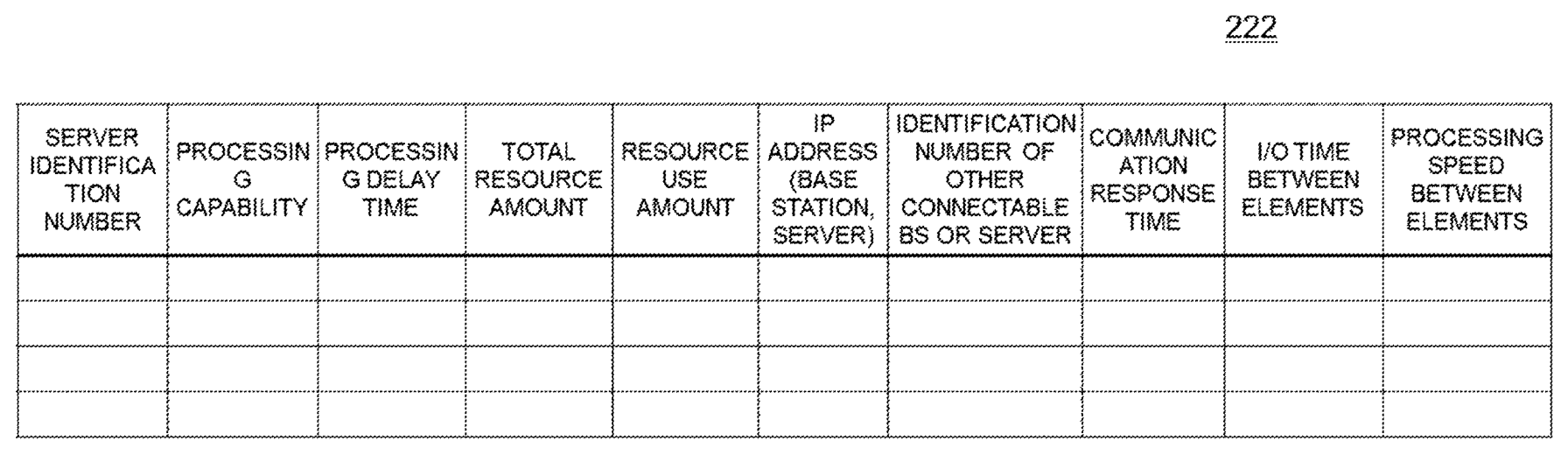

| SERVER IDENTIFICATION NUMBER | PROCESSING CAPABILITY | PROCESSING DELAY TIME | TOTAL RESOURCE AMOUNT | RESOURCE USE AMOUNT | IP ADDRESS (BASE STATION, SERVER) | IDENTIFICATION NUMBER OF OTHER CONNECTABLE BS OR SERVER | COMMUNICATION RESPONSE TIME | I/O TIME BETWEEN ELEMENTS | PROCESSING SPEED BETWEEN ELEMENTS |
|---|---|---|---|---|---|---|---|---|---|
| | | | | | | | | | |
| | | | | | | | | | |
| | | | | | | | | | |

| WIRELESS TERMINAL IDENTIFICATION NUMBER | VIRTUAL MACHINE INFORMATION 223 | | | |
| --- | --- | --- | --- | --- |
| | MAXIMUM & MINIMUM VALUES OF NUMBER OF ELEMENTS | MAXIMUM & MINIMUM VALUES OF SHARED MEMORY CAPACITY | MAXIMUM & MINIMUM VALUES OF PROCESSING DELAY | PARALLEL PROCESSING PARAMETER | REDUNDANCY PARAMETER |
| | | | | | |
| | | | | | |
| | | | | | |

Figure 11

| IDENTIFICATION NUMBER OF WIRELESS TERMINAL | TYPE OF APPLICATION | START DATE & TIME OF PROCESSING | END DATE & TIME OF PROCESSING | POSITION INFORMATION OF WIRELESS TERMINAL |
| --- | --- | --- | --- | --- |
|  |  |  |  |  |
|  |  |  |  |  |
|  |  |  |  |  |

| IDENTIFICATION NUMBER OF WIRELESS TERMINAL | CONSTRUCTION DATE & TIME OF VIRTUAL MACHINE | PROCESSING DELAY TIME OF VIRTUAL MACHINE | VIRTUAL MACHINE CONFIGURATION INFORMATION ||
|---|---|---|---|---|
| | | | SERVER IDENTIFICATION NUMBER | REGION OF PROCESSING FUNCTION |
| | | | | |
| | | | | |
| | | | | |

225

BASE STATION SYSTEM, NODE APPARATUS AND METHOD THEREIN

BACKGROUND

Technical Field

The present invention relates to a base station system, a node apparatus and a method therein.

Background Art

Spread of smartphones and Internet of Things (IoT) have diversified and advanced services that utilize networks. For example, video monitoring, automatic operation, and the like have been realized. To realize such services with different traffic characteristics in one network, it is needed to accelerate the data processing and appropriately allocate limited network resources to the services. In addition, apparatuses that process data are required to have high processing capability and high availability. Furthermore, terminals are required to provide high performance with low costs.

One example concept of realizing high performance processing with low-cost terminals is thin client (also referred to as thin client architecture). Thin client means an architecture where a terminal with at least minimum necessary functions is connected to a server and the server centrally executes a most portion of processing.

Another example concept of accelerating data processing is Mobile Edge Computing (MEC). MEC means an architecture where a part of data processing functionality is realized in a base station as a mobile edge in a radio access network or in a node to which communication delay from the base station is small, instead of realizing it in a cloud.

Further, a technique for operating a virtual machine on a communication terminal has been disclosed (e.g., refer to PTL 1).

[PTL 1] JP2013-197645 A

SUMMARY

The thin client architecture requires a large amount of resources on a server side. In the MEC, servers are deployed at respective base stations or at respective nodes having small communication delay from a base station, however, there are many base stations in a radio access network, and thus deploying a server with capability of performing an application program for a terminal in each base station will be economically inefficient (e.g., low cost-effectiveness).

In addition, in the technique described in PTL 1, a communication terminal is equipped with a virtual machine, and an application program is executed using only resources of the communication terminal (wireless terminal).

An example object of the present invention is to enable a wireless terminal apparatus to run an application program by using resources of other apparatuses.

According to an example aspect of the present invention, a base station system is provided including: a plurality of base stations configured to execute assigned functions each being a part of a plurality of functions of a virtual machine executing an application program for a wireless terminal apparatus, the plurality of functions of the virtual machine being distributedly executed by the plurality of base stations.

According to an example aspect of the present invention, a node apparatus is provided including: a memory storing instructions; and one or more processors configured to execute the instructions to distributedly assign, to a plurality of base stations, a plurality of functions of a virtual machine executing an application program for a wireless terminal apparatus. The plurality of functions of the virtual machine are assigned to the plurality of base stations, at least based on history information of handovers among the plurality of base stations.

According to an example aspect of the present invention, a method is provided including: distributedly assigning, to a plurality of base stations, a plurality of functions of a virtual machine executing an application program for a wireless terminal apparatus, and executing, by the plurality of base stations, the assigned functions.

According to the present invention, a wireless terminal apparatus can run an application program by using resources of other apparatuses. Note that, according to the present invention, instead of or together with the above advantageous effect, other advantageous effects may be exerted.

BRIEF DESCRIPTION OF THE DRAWINGS

FIG. 9 is an explanatory diagram of a first table.

FIG. 10 is an explanatory diagram of a second table.

FIG. 11 is an explanatory diagram of a third table.

FIG. 20 is an explanatory diagram of a fourth table.
FIG. 21 is an explanatory diagram of a fifth table.

DESCRIPTION OF THE EXAMPLE EMBODIMENTS

Figure 1:
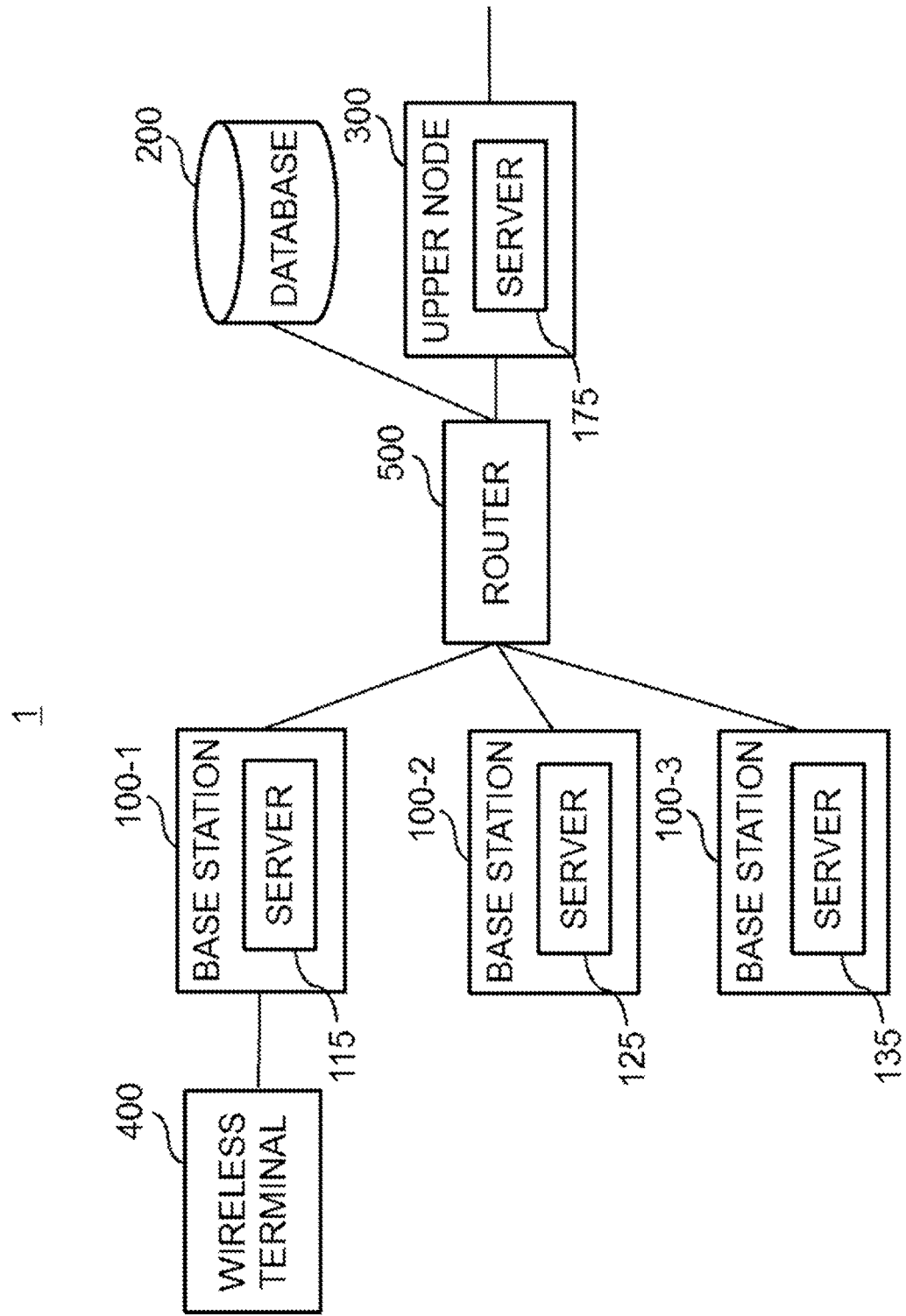
FIG. 1 is an explanatory diagram illustrating an example of a schematic configuration of a system according to a first example embodiment.

Hereinafter, example embodiments of the present invention will be described in detail with reference to the accompanying drawings. Note that, in the Specification and drawings, elements to which similar descriptions are applicable are denoted by the same reference signs, thus, overlapping descriptions may be omitted.

Descriptions will be given in the following order.
1. Overview of Example Embodiments of the Present Invention
2. First Example Embodiment
2.1. Configuration of System
2.2. Configuration of Base Station
2.3. Configuration of Database Apparatus
2.4. Configuration of Upper Node
2.5. Configuration of Wireless Terminal
2.6. Technical Features
2.7. Summary
3. Second Example Embodiment
3.1. Configuration of System
3.2. Configuration of Base Station
3.3. Configuration of Database Apparatus
3.4. Configuration of Upper Node
3.5. Configuration of Wireless Terminal
3.6. Technical Features
4. Third Example Embodiment
4.1. Configuration of System
4.2. Configurations of Base Station and Wireless Terminal
4.3. Configuration of Upper Node
4.4. Technical Features
5. Example Alterations

1. Overview of Example Embodiments of the Present Invention (1) Technical Problem The thin client architecture requires a large amount of resources on a server side. In the MEC, servers are deployed at respective base stations or at respective nodes having small communication delay from a base station, however, there are many base stations in a radio access network, and thus deploying a server with capability of performing an application program for a terminal in each base station will be economically inefficient (e.g., low cost-effectiveness).

In addition, a wireless terminal moves and performs a handover in a wireless network, and thus it is desirable that an application program for the wireless terminal continues operating even when the wireless terminal performs a handover.

An example object of example embodiments of the present invention is to enable a wireless terminal to perform an advanced application program by using resources of other apparatuses.

(2) Technical Features

According to an example embodiment of the present invention, a base station system includes: a plurality of base stations configured to execute assigned functions each being a part of a plurality of functions of a virtual machine executing an application program for a wireless terminal apparatus, the plurality of functions of the virtual machine being distributedly executed by the plurality of base stations.

Further, according to an example embodiment of the present invention, a node apparatus includes a memory storing instructions; and one or more processors configured to execute the instructions to distributedly assign, to a plurality of base stations, a plurality of functions of a virtual machine executing an application program for a wireless terminal apparatus, the plurality of functions of the virtual machine being assigned to the plurality of base stations, at least based on history information of handovers among the plurality of base stations.

In this way, a wireless terminal can run an application program by using resources of other apparatuses.

Note that the above-described technical features are specific examples of the example embodiments of the present invention and, of course, the example embodiments of the present invention are not limited to the above-described technical features.

2. First Example Embodiment

<2.1. Configuration of System>

The following will describe a first example embodiment of the present invention with reference to FIGS. 1 to 16.

With reference to FIG. 1, an example of a configuration of a system 1 according to the first example embodiment will be described. FIG. 1 is an explanatory diagram illustrating an example of a schematic configuration of the system 1 according to the first example embodiment of the present invention.

The system 1 includes, for example, a plurality of base stations 100, a database apparatus 200, an upper (or higher) node (a core network node, a node apparatus) 300, and a router 500. In the example of FIG. 1, the base stations 100 are illustrated as three base stations 100-1, 100-2, and 100-3. Without limitation to three base stations 100, the first example embodiment can be described with four or more base stations 100 or two base stations 100. In the following description, when it is not particularly necessary to distinguish between base stations, the base stations may be collectively referred to as the base station 100 or the base stations 100. The system 1 may also be referred to as a base station system. A system constituted by the plurality of base stations 100 may be referred to as a base station system. Each of the base stations 100, the upper node 300, and servers may be referred to as a network apparatus.

The base stations 100 (e.g., a base station 100-1, a base station 100-2, and the like) communicate with one another through the router 500. The base stations 100 also communicate with the upper node 300 through the router 500. The base stations 100 and the upper node 300 communicate with the database apparatus 200 through the router 500.

For example, the system 1 is a system that conforms to 3GPP standards. More specifically, the system 1 may be a system that conforms to LTE/LTE-Advanced and/or System Architecture Evolution (SAE). Alternatively, the system 1 may be a system that conforms to fifth generation (5G) standards or a Universal Mobile Telecommunications System (UMTS) that conforms to third generation (3G) standards. The system 1 is, of course, not limited to these examples.

(1) Base Station 100

The base station 100 is a node that performs wireless communication with a wireless terminal (wireless terminal apparatus) 400, in other words, a Radio Access Network (RAN) node. For example, the base station 100 may be an eNB, a generation Node B (gNB) in 5G, or a Node B and/or a Radio Network Controller (RNC) in 3G. The base station 100 may include a plurality of units (or a plurality of nodes). The plurality of units (or the plurality of nodes) may include a first unit (or a first node) configured to perform higher protocol layer processing and a second unit (or a second node) configured to perform lower protocol layer processing. As an example, the first unit may be referred to as a center/central unit (CU), and the second unit may be referred to as a distributed unit (DU) or an access unit (AU). As another example, the first unit may be referred to as a digital unit (DU), and the second unit may be referred to as a radio unit (RU) or a remote unit (RU). The digital unit (DU) may be a base band unit (BBU), and the RU may be a remote radio head (RRH) or a remote radio unit (RRU). The terms for the first unit (or the first node) and the second unit (or the second node) are, of course, not limited to these examples. Alternatively, the base station 100 may be a single unit (or a single node). In this case, the base station 100 may be one of the plurality of units described above (e.g., one of the first unit and the second unit) and may be connected to another one of the plurality of units (e.g., the other one of the first unit and the second unit).

In the first example embodiment, the base station 100 has a server function. For example, the base station 100-1 has a function of a server 115; the base station 100-2 has a function of a server 125; and a base station 100-3 has a function of a server 135. Note that the system 1 may include a base station that does not include a server.

(2) Database Apparatus 200

The database apparatus 200 can be accessed, for example, from the base station 100 and the upper node 300 through the router 500. The database apparatus 200 can be located at any appropriate location without limitation to the illustrated example.

(3) Upper Node 300

The upper node 300 is, for example, an Evolved Packet Core (EPC) that accommodates an LTE radio access network. The upper node 300 is, for example, a core network apparatus that accommodates a 5G radio access network. The upper node 300 has the function of a server 175. The plurality of functions of a virtual machine that executes an application program for the wireless terminal 400 are distributedly executed by the servers provided in the base stations 100 and upper node 300. For example, elements constituting the functions of the virtual machine are assigned to the servers in accordance with predetermined criteria. The virtual machine and elements will be described later in details.

(4) Wireless Terminal 400

The wireless terminal 400 can communicate with a base station 100. For example, when the wireless terminal 400 is located in a cell (in a coverage area) of the base station 100-1, the wireless terminal 400 is wirelessly connected to the base station 100-1 and the wireless terminal 400 can wirelessly communicate with the base station 100-1. When the wireless terminal 400 moves into a cell of the base station 100-2, the wireless terminal 400 is connected to the base station 100-2. The similar operation occurs when the wireless terminal 400 moves into a cell of the base station 100-3. The wireless terminal 400 is, for example, a User Equipment (UE).

(5) Router 500

The router 500 transfers data among the base stations 100, the database apparatus 200, and the upper node 300. The router 500 may be a switch or a hub.

<2.2. Configuration of Base Station>

Figure 2:
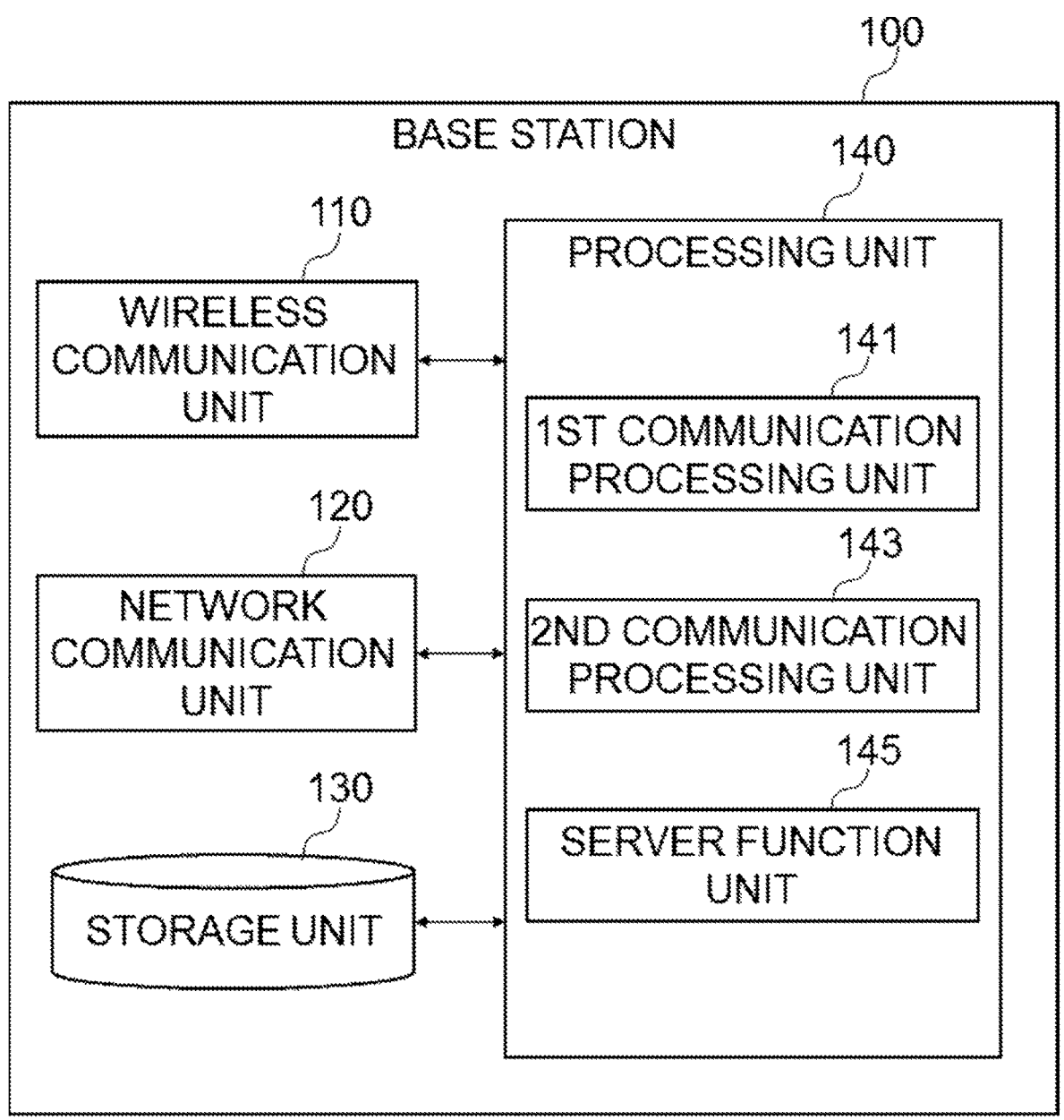
FIG. 2 is a block diagram illustrating an example of a schematic configuration of a base station according to the first example embodiment.

First, with reference to FIG. 2, an example of a configuration of the base station 100 according to the first example embodiment will be described. FIG. 2 is a block diagram illustrating an example of a schematic configuration of the base station 100 according to the first example embodiment. The base station 100 includes a wireless communication unit 110, a network communication unit 120, a storage unit 130, and a processing unit 140.

(1) Wireless Communication Unit 110

The wireless communication unit 110 transmits and/or receives a signal wirelessly. For example, the wireless communication unit 110 receives a signal from the wireless terminal 400 and transmits a signal to the wireless terminal 400.

(2) Network Communication Unit 120

The network communication unit 120 receives a signal from a network (e.g., the router 500), and transmits a signal to the network (e.g., the router 500).

(3) Storage Unit 130

The storage unit 130 temporarily or permanently stores programs and parameters for operations of the base station 100 as well as various data.

(4) Processing Unit 140

The processing unit 140 provides various functions of the base station 100. The processing unit 140 includes a first communication processing unit 141, a second communication processing unit 143, and a server function unit 145. Note that the processing unit 140 may further include constituent elements other than these constituent elements. In other words, the processing unit 140 may also perform operations other than the operations of these constituent elements. Concrete operations of the first communication processing unit 141, the second communication processing unit 143, and the server function unit 145 will be described later in detail.

For example, the processing unit 140 (first communication processing unit 141) communicates with the database apparatus 200 and the upper node 300 via the network communication unit 120. For example, the processing unit 140 (second communication processing unit 143) communicates with the wireless terminal 400 via the wireless communication unit 110. For example, the processing unit 140 (server function unit 145) executes a part of the functions of the virtual machine that executes the application program for the wireless terminal 400.

(5) Implementation Example

The wireless communication unit 110 may be implemented with an antenna, a radio frequency (RF) circuit, and the like. The network communication unit 120 may be implemented with a network adapter, a network interface card, or the like. The storage unit 130 may be implemented with a memory (e.g., a nonvolatile memory and/or a volatile memory) and/or a hard disk, and the like. The processing unit 140 may be implemented with a baseband (BB) processor and/or a different processor, and the like. The first communication processing unit 141, the second communication unit 143, and the server function unit 145 may be implemented with the same processor or may be implemented with separate processors. The memory (storage unit 130) may be included in such a processor (chip).

The base station 100 may include a memory configured to store a program and one or more processors that can execute the program, and the one or more processors may perform operations of the processing unit 140 (operations of the first communication processing unit 141, the second communication processing unit 143, and the server function unit 145). The program may be a program for causing the processor(s) to perform operations of the processing unit 140 (operations of the first communication processing unit 141, the second communication processing unit 143, and the server function unit 145).

<2.3. Configuration of Database Apparatus>

Figure 3:
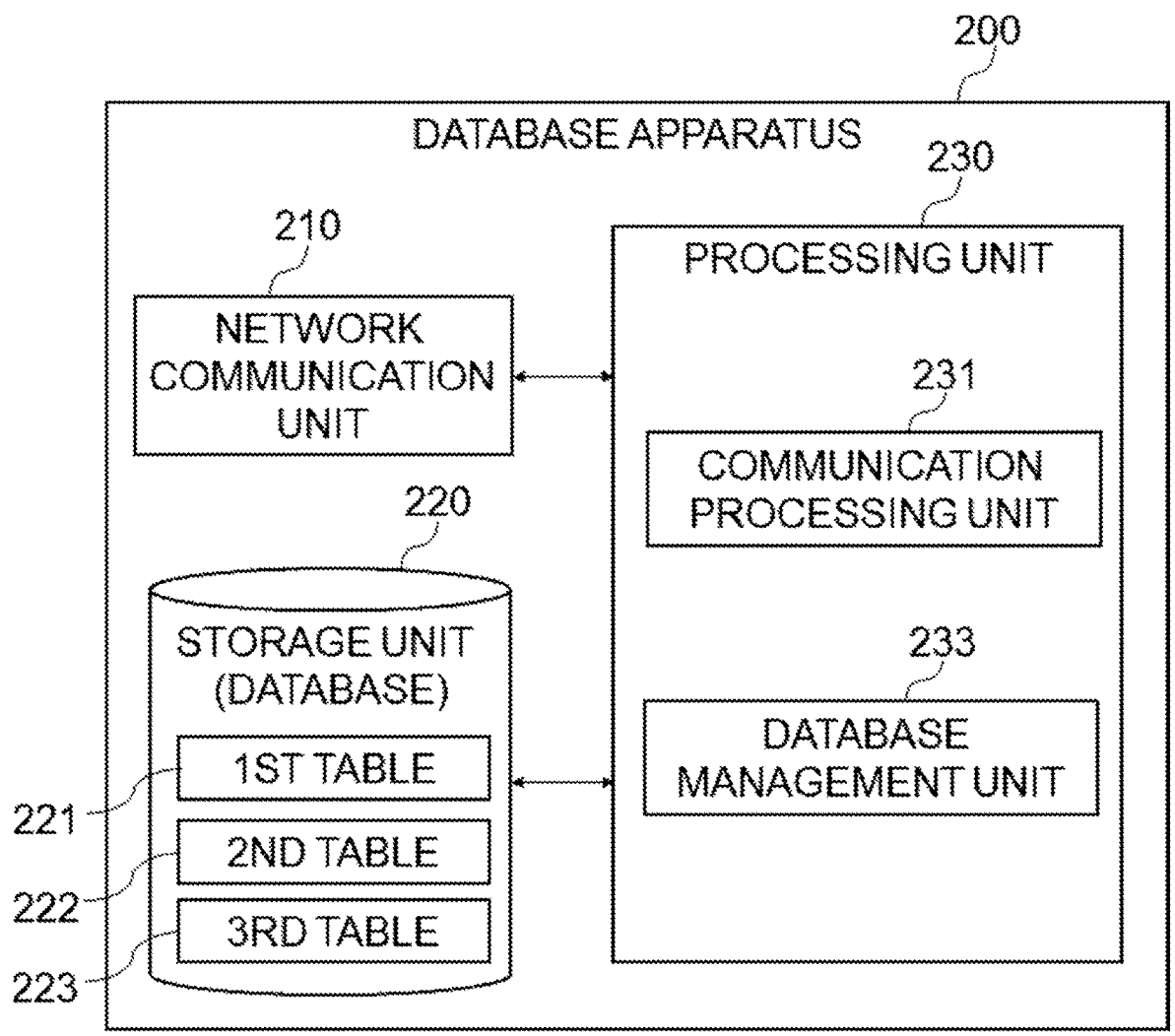
FIG. 3 is a block diagram illustrating an example of a schematic configuration of a data base apparatus according to the first example embodiment.

Next, with reference to FIG. 3, an example of a configuration of the database apparatus 200 according to the first example embodiment will be described. FIG. 3 is a block diagram illustrating an example of a schematic configuration of the database apparatus 200 according to the first example embodiment. The database apparatus 200 includes a network communication unit 210, a storage unit 220, and a processing unit 230.

(1) Network Communication Unit 210

The network communication unit 210 receives a signal from the network and transmits a signal to the network.

(2) Storage Unit 220

The storage unit 220 temporarily or permanently stores programs and parameters for operations of the database apparatus 200 as well as various data. The storage unit 220 also stores a database including a first table 221, a second table 222, and a third table 223. Each table will be described later in detail.

(3) Processing Unit 230

The processing unit 230 provides various functions of the database apparatus 200. The processing unit 230 includes a communication processing unit 231 and a database management unit 233. Note that the processing unit 230 may further include constituent elements other than these constituent elements. In other words, the processing unit 230 may also perform operations other than the operations of these constituent elements. Concrete operations of the communication processing unit 231 and the database management unit 233 will be described later in detail.

For example, the processing unit 230 (communication processing unit 231) communicates with other nodes via the network communication unit 210. Specifically, for example, the processing unit 230 (communication processing unit 231) communicates with the base stations 100 and the upper node 300 via the network communication unit 210. The processing unit 230 (database management unit 233), for example, extracts desired information from the database in response to a request from any of the base stations 100 and the upper node 300, and transmits the extracted information to the base station 100 or upper node 300 as a response. The processing unit 230 (database management unit 233), for example, updates information in the database in response to a request from any of the base stations 100 and the upper node 300. The processing unit 230 (database management unit 233) may store, in the database, information from another external apparatus other than the base stations 100 and the upper node 300, for example, in a case of initial setting.

(4) Implementation Example

The network communication unit 210 may be implemented with a network adapter, a network interface card, or the like. The storage unit 220 may be implemented with a memory (e.g., a nonvolatile memory and/or a volatile memory) and/or a hard disk, and the like. The processing unit 230 may be implemented with a processor and the like. The communication processing unit 231 and the database management unit 233 may be implemented with the same processor or may be implemented with separate processors. The memory (storage unit 220) may be included in such a processor (chip).

The database apparatus 200 may include a memory configured to store a program and one or more processors that can execute the program, and the one or more processors may perform operations of the processing unit 230 (operations of the communication processing unit 231 and the database management unit 233). The program may be a program for causing the processor(s) to perform operations of the processing unit 230 (operations of the communication processing unit 231 and the database management unit 233).

<2.4. Configuration of Upper Node>

Figure 4:
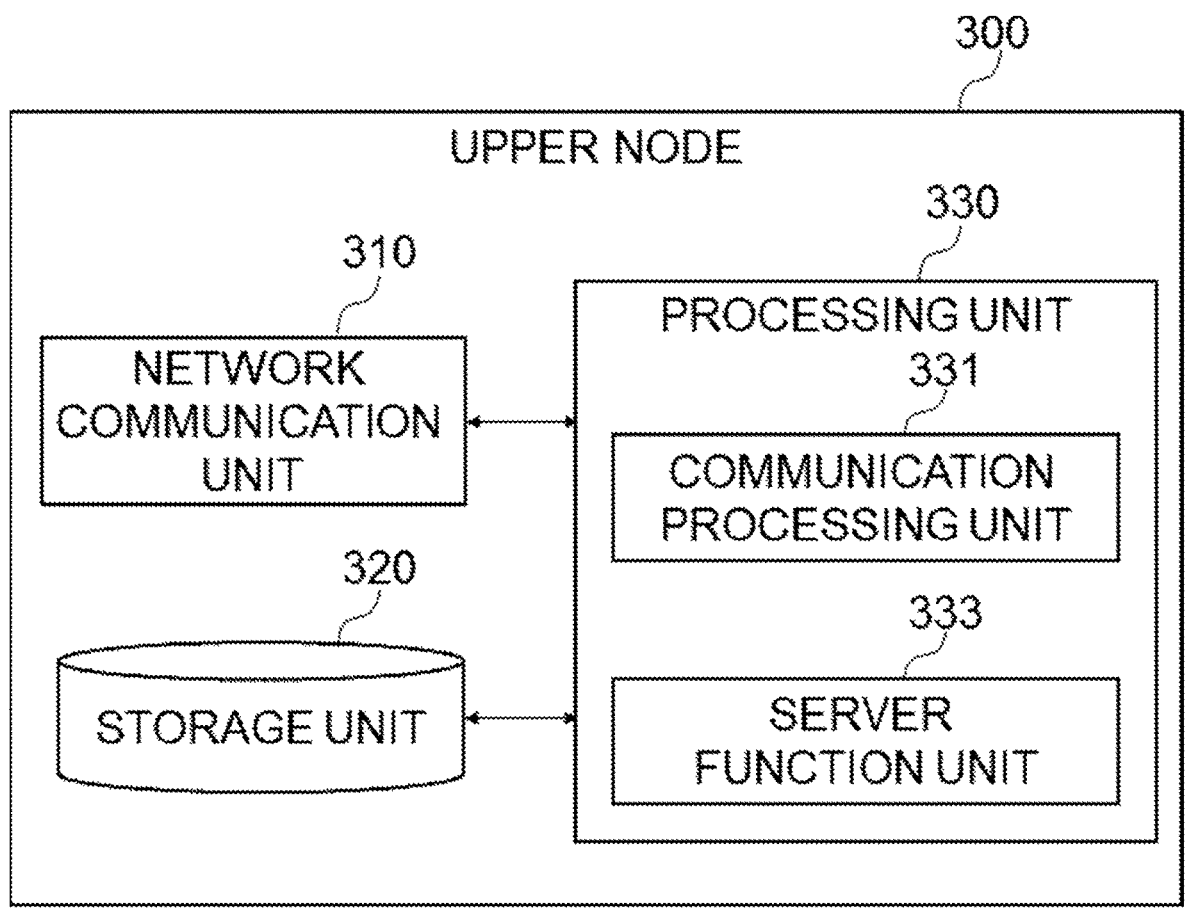
FIG. 4 is a block diagram illustrating an example of a schematic configuration of an upper node according to the first example embodiment.

Next, with reference to FIG. 4, an example of a configuration of the upper node 300 according to the first example embodiment will be described. FIG. 4 is a block diagram illustrating an example of a schematic configuration of the upper node 300 according to the first example embodiment. With reference to FIG. 4, the upper node 300 includes a network communication unit 310, a storage unit 320, and a processing unit 330.

(1) Network Communication Unit 310

The network communication unit 310 receives a signal from the network and transmits a signal to the network.

(2) Storage Unit 320

The storage unit 320 temporarily or permanently stores programs and parameters for operations of the upper node 300 as well as various data.

(3) Processing Unit 330

The processing unit 330 provides various functions of the upper node 300. The processing unit 330 includes a communication processing unit 331 and a server function unit 333. Note that the processing unit 330 may further include constituent elements other than these constituent elements. In other words, the processing unit 330 may also perform operations other than the operations of these constituent elements. Concrete operations of the communication processing unit 331, and the server function unit 333 will be described later in detail.

For example, the processing unit 330 (communication processing unit 331) communicates with other nodes via the network communication unit 310. Specifically, for example, the processing unit 330 (communication processing unit 331) communicates with the base stations 100 and the database apparatus 200 via the network communication unit 310. The processing unit 330 (server function unit 333) runs a part of the functions of the virtual machine that executes the application program for the wireless terminal 400. The processing unit 330 (server function unit 333) assigns functions of the virtual machine that executes the application program for the wireless terminal 400 to servers in the system 1.

(4) Implementation Example

The network communication unit 310 may be implemented with a network adapter, a network interface card, or the like. The storage unit 320 may be implemented with a memory (e.g., a nonvolatile memory and/or a volatile memory) and/or a hard disk, and the like. The processing unit 330 may be implemented with a processor and the like. The communication processing unit 331 and the server function unit 333 may be implemented with the same processor or may be implemented with separate processors. The memory (storage unit 320) may be included in such a processor (chip).

The upper node 300 may include a memory configured to store a program and one or more processors that can execute the program, and the one or more processors may perform operations of the processing unit 330 (operations of the communication processing unit 331 and the server function unit 333). The program may be a program for causing the processor(s) to perform operations of the processing unit 330 (operations of the communication processing unit 331 and the server function unit 333).

<2.5. Configuration of Wireless Terminal>

Figure 5:
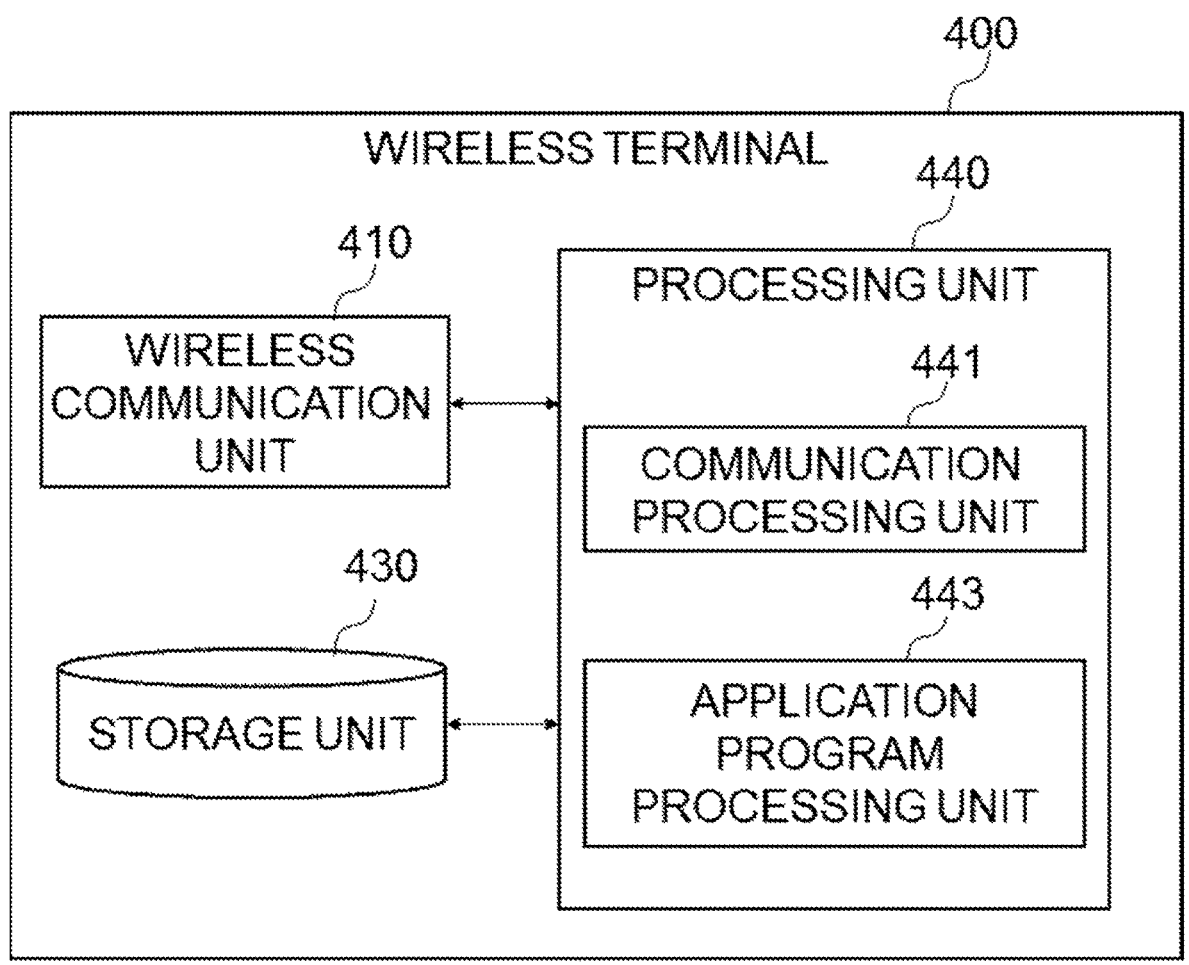
FIG. 5 is a block diagram illustrating an example of a schematic configuration of a wireless terminal according to the first example embodiment.

Next, with reference to FIG. 5, an example of a configuration of the wireless terminal 400 according to the first example embodiment will be described. FIG. 5 is a block diagram illustrating an example of a schematic configuration of the wireless terminal 400 according to the first example embodiment. With reference to FIG. 5, the wireless terminal 400 includes a wireless communication unit 410, a storage unit 430, and a processing unit 440.

(1) Wireless Communication Unit 410

The wireless communication unit 410 transmits and/or receives a signal wirelessly. For example, the wireless communication unit 410 receives a signal from the base station 100 and transmits a signal to the base station 100.

(2) Storage Unit 430

The storage unit 430 temporarily or permanently stores programs and parameters for operations of the wireless terminal 400 as well as various data.

(3) Processing Unit 440

The processing unit 440 provides various functions of the wireless terminal 400. The processing unit 440 includes a communication processing unit 441 and an application program processing unit 443. Note that the processing unit 440 may further include constituent elements other than these constituent elements. In other words, the processing unit 440 may also perform operations other than the operations of these constituent elements. Concrete operations of the communication processing unit 441 and the application program processing unit 443 will be described later in detail.

For example, the processing unit 440 (communication processing unit 441) communicates with the base station 100. For example, the processing unit 440 (application program processing unit 443) executes the application program in cooperation with the virtual machine. For example, the processing unit 440 (application program processing unit 443) requests the upper node 300 to execute the application program by using the virtual machine. For example, the processing unit 440 (application program processing unit 443) may transmit information stored in the wireless terminal 400 and receive a result of execution from the virtual machine. For example, the processing unit 440 (application program processing unit 443) may display the result of execution of the application program on a display unit of the wireless terminal 400 or the like.

(4) Implementation Example

The wireless communication unit 410 may be implemented with an antenna, a radio frequency (RF) circuit, and the like. The storage unit 430 may be implemented with a memory (e.g., a nonvolatile memory and/or a volatile memory) and/or a hard disk, and the like. The processing unit 440 may be implemented with a baseband (BB) processor and/or a different processor, and the like. The communication processing unit 441 and the application program processing unit 443 may be implemented with the same processor or may be implemented with separate processors. The memory (storage unit 430) may be included in such a processor (chip).

The wireless terminal 400 may include a memory configured to store a program and one or more processors that can execute the program, and the one or more processors may perform operations of the processing unit 440 (operations of the communication processing unit 441 and the application program processing unit 443). The program may be a program for causing the processor(s) to perform operations of the processing unit 440 (operations of the communication processing unit 441 and the application program processing unit 443).

<2.6. Technical Features>

The following will describe the technical features of the first example embodiment with reference to FIGS. 6 to 16.

(1) Program

A program executed by each of the servers (e.g., the server 115, the server 125, and the server 135) of the base stations 100 will be described. Although the following description will be about the server 115 for convenience of description, similar description can be applied to the server 125 and the server 135.

The server 115 executes a program for generating an element. Here, the element is, for example, an emulator that virtually emulates a small computer. One server can generate a plurality of elements. The element performs a part of functions that is necessary to constitute a virtual machine.

(2) Virtual Machine

Figure 6:
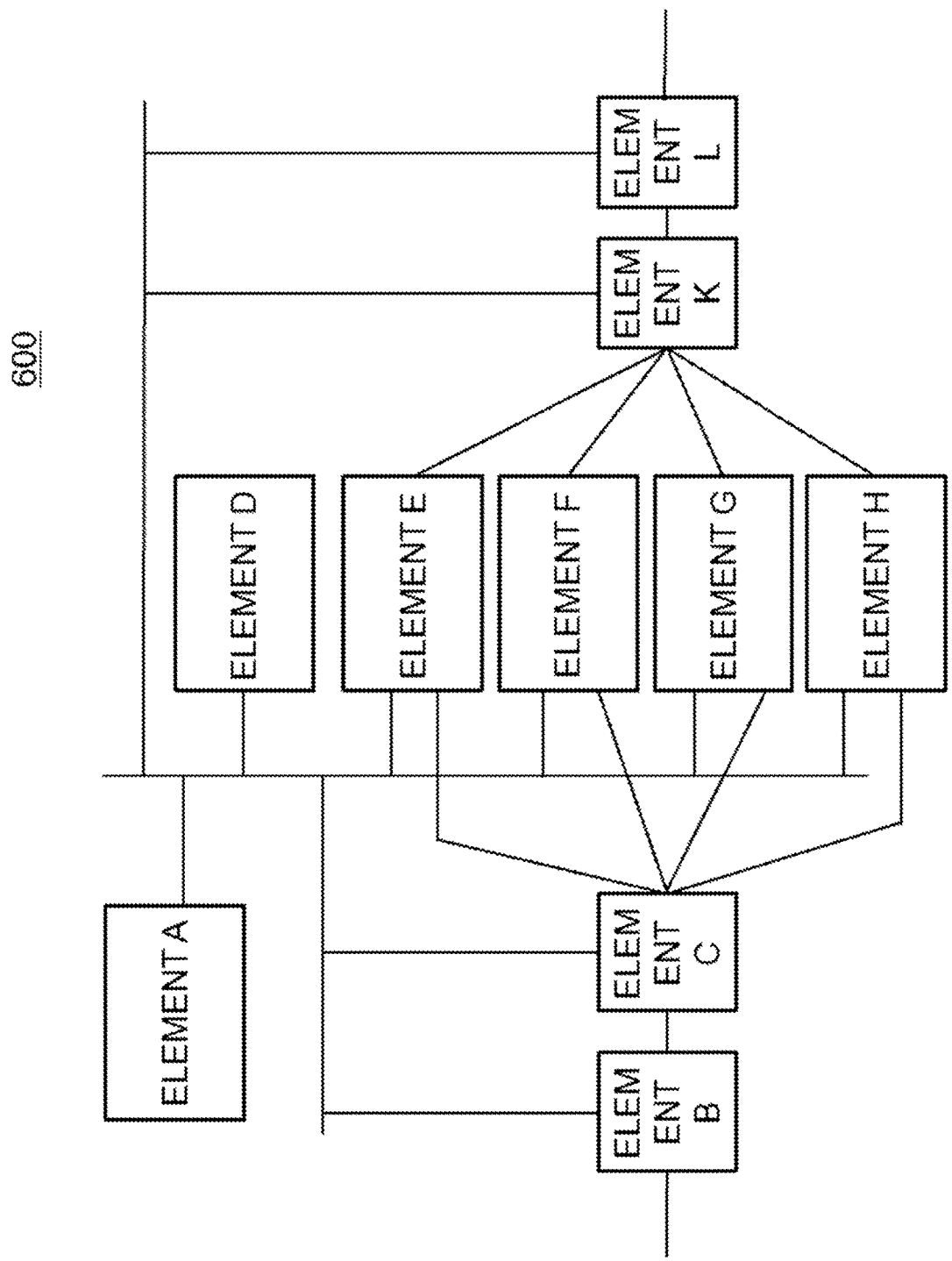
FIG. 6 is a diagram illustrating a relationship between a virtual machine and elements.

The following will describe the virtual machine. FIG. 6 is a diagram illustrating a relationship between the virtual machine and the elements.

A virtual machine 600 emulates operations of a computer. As illustrated in FIG. 6, the virtual machine 600 is constituted by a plurality of elements. In other words, the virtual machine 600 is a virtual computer (emulator) of which performance is improved by combining small computers (elements) and causing the small computers to perform synchronous processing and/or parallel processing. The plurality of small computers (elements) constituting this virtual computer are also virtual computers (emulators). The elements are, for example, generated by a plurality of servers. As such, processing of elements may be executed by different servers. Some elements may be executed by the same server.

The following will describe a relationship between the virtual machine 600 and the wireless terminal 400. One virtual machine 600 is assigned for one wireless terminal 400. The virtual machine 600 performs an application program for the wireless terminal 400. In this way, the wireless terminal 400 can utilize higher performance and a larger memory capacity than its performance of central processing unit(s) (CPU) and memory capacity of its own and can run an advanced application program.

Figure 7:
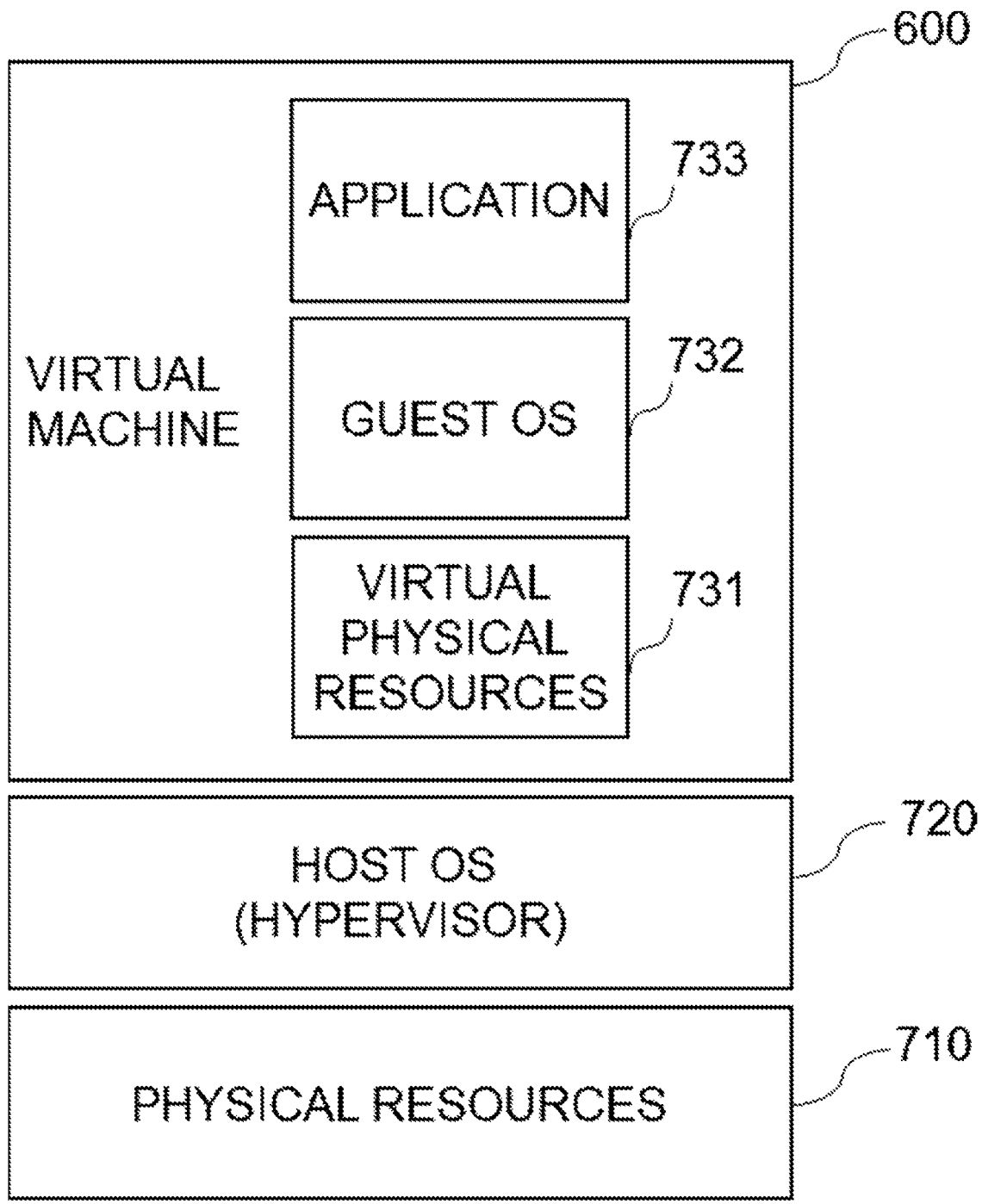
FIG. 7 is a diagram representing an abstracted relationship between the virtual machine and the wireless terminal in a layer structure.

FIG. 7 is a diagram representing an abstracted relationship between the virtual machine 600 and the wireless terminal 400 in a layered structure. Physical resources 710 correspond to the processing unit (CPU) 440, the storage unit (Read Only Memory (ROM), Random Access Memory (RAM)) 430, the wireless communication unit 410, arbitrary input and output apparatuses that are included in the wireless terminal 400 itself, and corresponds to control of these units. As the physical resources 710, the wireless terminal 400 may, in some cases, further include apparatuses, such as a sensor apparatus, a driving apparatus, and a communication apparatus.

A host OS 720 corresponds to an operating system (OS) executed by the wireless terminal 400 itself. Note that this layer may be a hypervisor.

The virtual machine 600 corresponds to an emulator of a computer that operates on the host OS 720 (through the layer 720). The virtual machine 600 can be abstracted in the layers of virtual physical resources 731, guest OS 732, and application 733 in the order from lower to higher layers.

Figure 8:
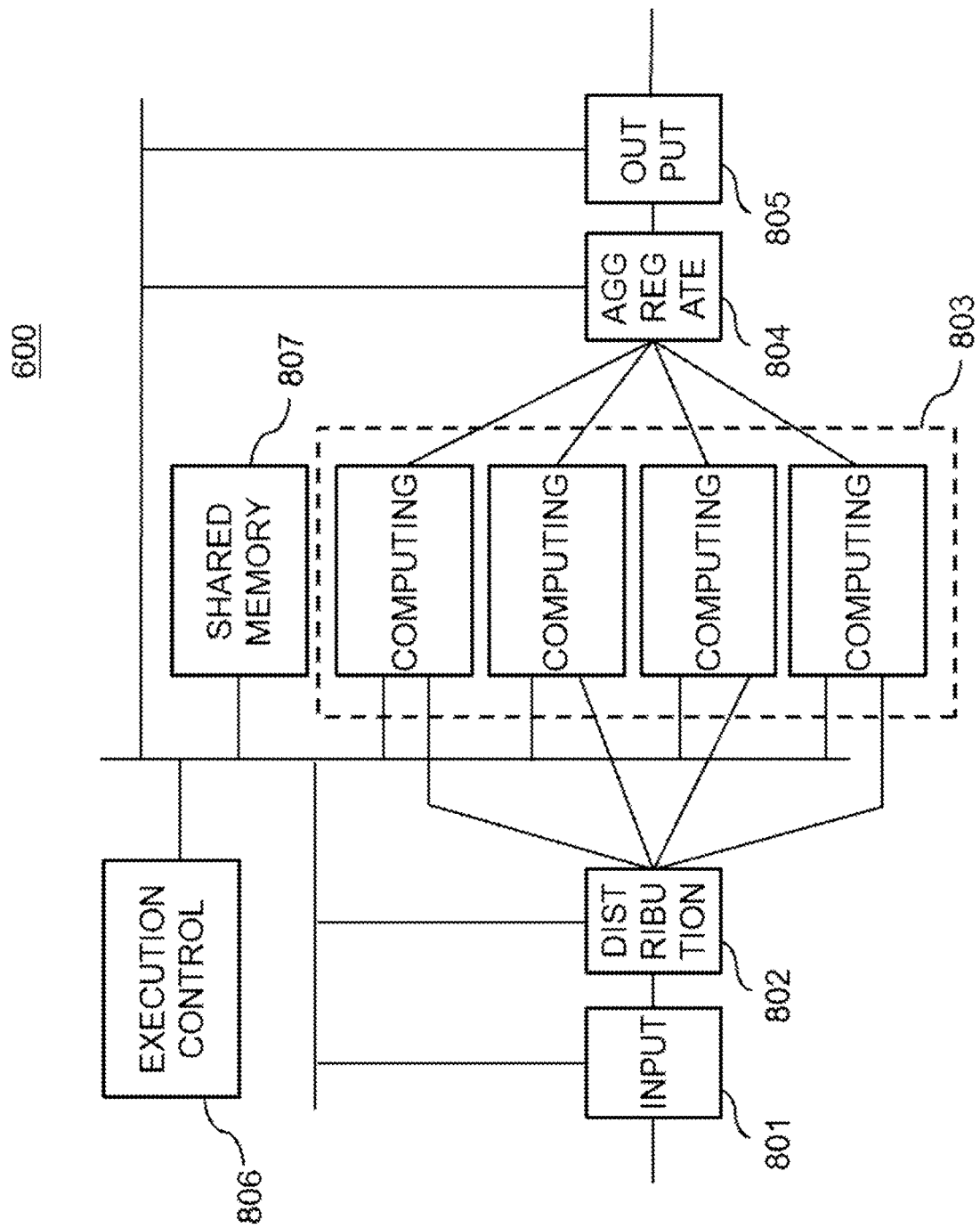
FIG. 8 is a diagram illustrating a specific example of the virtual machine.

FIG. 8 is a diagram illustrating a specific example of the virtual machine 600.

The virtual machine 600 includes, for example, an input function 801, a distribution function 802, a computing function 803, an aggregate function 804, an output function 805, an execution control function 806, and a shared memory function 807. The configuration and connection of the functions illustrated in FIG. 8 are an example of the virtual machine 600.

The input function 801 corresponds to an input apparatus in computer architecture. The distribution function 802 is a mechanism for parallel computing and parallel distributed processing and is a function of dividing data obtained from the input function 801 and delivering the divided data to the computing function 803. The computing function 803 corresponds to arithmetic units of a CPU in computer architecture. The computing function 803 may also include functionality of an accumulator or a register of a CPU. The aggregate function 804 is a mechanism for parallel computing and parallel distributed processing and is a function of synchronizing and aggregating a plurality of data obtained from the computing function 803 and delivering the aggregated data to the output function 805. The output function 805 corresponds to an output apparatus in computer architecture. The execution control function 806 corresponds to a control mechanism (a control unit) of a CPU in computer architecture. The execution control function 806 may also include functionality of an instruction counter (a program counter) or a register of a CPU. The shared memory function 807 corresponds to a memory or a cache in computer architecture. The shared memory function 807 may also include functionality of a register of a CPU.

Each function may be constituted by one element. An arbitrary server is connected (or communicative) with other servers. As such, regardless of a server that implements an element, predetermined processing can be preceded or followed by other processing, and a shared memory can be accessed in predetermined processing. Even when a predetermined function and another function correspond to elements of the same server, both functions can be executed since the functions are processing of a program in the same server. Likewise, even when a predetermined function and a shared memory are elements of the same server, the shared memory can be accessed in the predetermined processing.

Further, each function may be constituted by a plurality of elements. The example of FIG. 8 is an example where the computing function 803 is constituted by four elements.

Note that the shared memory function 807 may be constituted, without limitation to an element, by a memory of the server 115 in the base station 100 (e.g., the storage unit 130) or a memory of other servers or apparatuses (e.g., the storage unit 320).

(3) Information Stored in Database Apparatus 200

The following will describe information stored in the database apparatus 200.

The storage unit (database) 220 of the database apparatus 200 includes, for example, three tables. Each table may be divided into a plurality of tables. In other words, each table may be configured as relational tables. Note that, other than the table format, any format where information elements described later are associated with one another may be used.

The database apparatus 200 stores handover history information. The handover history information is, for example, stored in the first table 221 below.

First Table

FIG. 9 is an explanatory diagram of the first table 221. The first table 221 is a table indicating a history of connections between wireless terminals 400 and base stations 100. The first table 221 include, for example, the following information elements (columns, fields).

Information indicating any one of attach, detach, and handover. In other words, a connection processing type between a wireless terminal 400 and a base station 100.

Identification number unique to the wireless terminal 400 that has performed any one of the attach, detach, and handover. For example, International Mobile Equipment Identifier (IMEI) can be used.

Date and time when any one of the attach, detach and handover has occurred.

Unique identification number of the base station 100 where either the attach or detach has occurred.

Unique identification number of the base station 100 as a handover source from which a handover has been performed.

Unique identification number of the base station 100 as a handover target to which a handover has been performed.

Note that, in the Specification, information related to a handover among the above-described information elements may be collectively referred to as handover history information. For example, the handover history information includes a connection processing type, a unique number of the wireless terminal 400, date and time when a handover occurred, a unique identification number of the base station 100 as a handover source, and a unique identification number of the base station 100 as a handover target. Note that a part of these information elements (e.g., the unique number of the wireless terminal 400 and date and time when a handover occurred) may be omitted from the handover history information. The handover history information is, for example, stored in the first table 221 by each base station 100. The first table 221 stores not only handover history information about a handover history of a specific wireless terminal 400 but also handover history information about handover histories of respective other wireless terminals 400 in the radio access network 1. Two base stations between which a handover has been performed can be identified by a unique identification number of a base station as a handover source (e.g., the base station 100-1) and a unique identification number of a base station as a handover target (e.g., the base station 100-2). Likewise, information related to attach among the above-described information elements may be collectively referred to as attach history information, and information related to detach among the above-described information elements may be collectively referred to as detach history information. Note that the above-described identification numbers may be any identification information or any identifiers without limitation to the numbers. This can apply to identification numbers stored in other tables.

Second Table

FIG. 10 is an explanatory diagram of the second table 222. The second table 222 is a table including information of base stations 100 and servers. The second table 222 includes, for example, the following information elements (columns, fields).

Unique identification number of a server (e.g., unique identification number of the base station 100 that has the server).

Processing capability of the server.

Processing delay time of the server.

Total amount of server resources.

Use amount of server resources.

IP address of the base station or the server.

Unique identification number(s) of other base station(s) or server(s) that can be connected from the base station or the server.

Response time(s) of communication with other base station(s) and server(s) that can be connected from the base station or the server.

Input and/or output time(s) between elements.

Processing speed(s) of element(s).

Note that, in addition to these information elements, any information relating to the server can be included. For example, the number of times of failures and total operation time of the server may be included. The above-described information elements may be stored in advance and updated as necessary.

Third Table

FIG. 11 is an explanatory diagram of the third table 223. The third table 223 is a table indicating information of the virtual machine 600 to be assigned to the wireless terminal 400 in association with a unique identification number of the wireless terminal 400. The third table 223 includes, for example, the following information elements (columns, fields).

Unique identification number of the wireless terminal 400 to which the virtual machine 600 is assigned.

Information of the virtual machine 600 to be assigned to the wireless terminal 400. The information of the virtual machine 600 to be assigned includes the following information elements (columns, fields).

The maximum value and the minimum value of the number of elements.

The maximum value and the minimum value of a shared memory capacity.

The maximum value and the minimum value of processing delay of the virtual machine.

Parameter of parallel processing. The parameter of parallel processing may indicate the number of parallel processing, for example, for each function that constitutes the virtual machine 600.

Redundancy parameter. The redundancy parameter may indicate, for example, whether redundant processing is performed for each function constituting the virtual machine 600. Further, each redundancy parameter may indicate a redundancy number (duplex, triplex, and the like).

The above-described maximum values and minimum values may be set to "non-limited". The information of the third table 223 is set in advance. In addition, the information in the third table 223 can be changed as necessary depending on an operation of the system.

(4) Processing Flow

With reference to FIGS. 12 to 16, an example of processing according to the first example embodiment will be described.

Figure 13:
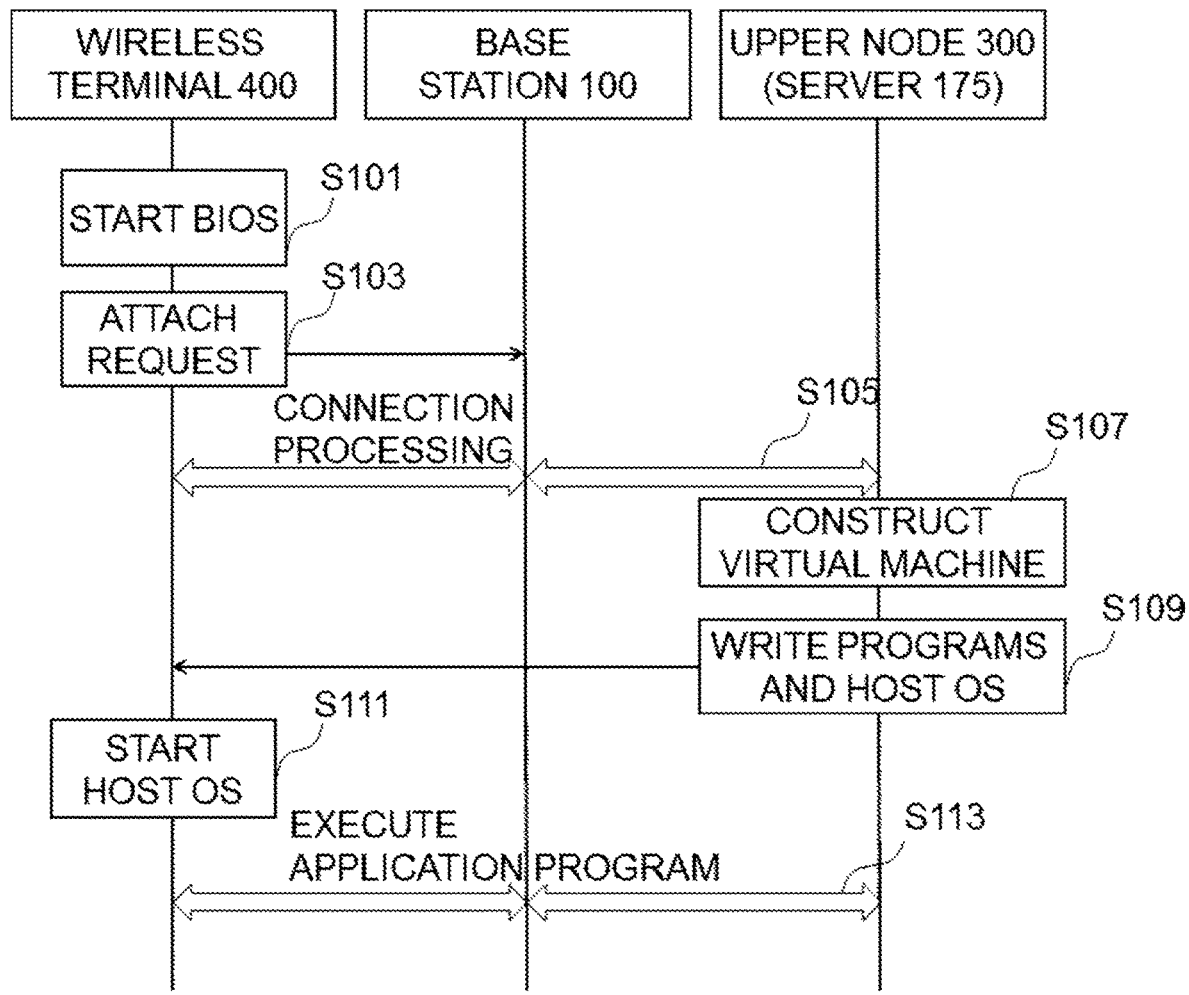
FIG. 13 is a sequence diagram for describing an operation of the wireless terminal and a server according to the first example embodiment.

First, operations of the wireless terminal 400 and the server 175 will be described. FIG. 13 is a sequence diagram for describing operations of the wireless terminal 400 and the server 175 according to the first example embodiment. The wireless terminal 400 activates a BIOS program in the ROM (S101). The wireless terminal 400 (the BIOS program) transmits a connection request (an attach request) to the base station 100-1 (S103). Each apparatus in the radio access network executes predefined connection processing (S105), and thereby the wireless terminal 400 is connected to the radio access network. In this way, the upper node 300 and the server 175 of the upper node 300 are enabled to communicate with the wireless terminal 400.

Next, the server 175 of the upper node 300 constructs the virtual machine 600 and assigns the virtual machine 600 to the wireless terminal 400 (S107). This operation will be described later in details. The server 175 writes a program for a host OS 720 into the storage unit 430 (e.g., a RAM) of the wireless terminal 400 (S109). Note that, as another example, the operation of writing the program of the host OS 720 in the wireless terminal 400 may be performed by the server 115 of the base station 100-1 to which the wireless terminal 400 is connected. Alternatively, the writing operation may be performed by a server (the server 125 or the server 135) of a base station, other than the base station 100-1 to which the wireless terminal 400 is connected. Alternatively, the writing operation may be performed by another server that is located in the radio access network. For example, the writing operation may be performed by a server 950 of the second example embodiment described later. As still another example, the program of the host OS 720 may be written in the storage unit 430 (e.g., a ROM) in advance.

Next, the wireless terminal 400 activates the host OS 720 (S111). The host OS 720 activates the virtual machine 600. Then, the wireless terminal 400 executes an application program by using the virtual machine 600 (S113).

The following will describe an operation where the base station 100-1 (the second communication processing unit 143) stores information in the first table 221.

The base station 100-1 communicates with the database apparatus 200. For example, when the wireless terminal 400 attaches to the base station 100-1, the base station 100-1 stores type information indicating the attach, date and time of the attach, a unique identification number of the wireless terminal 400, and a unique identification number of the base station 100-1 in the first table 221.

For example, when the wireless terminal 400 detaches from the base station 100-1, the base station 100-1 stores type information indicating the detach, date and time of the detach, the unique identification number of the wireless terminal 400, the unique identification number of the base station 100-1 in the first table 221.

For example, when the wireless terminal 400 performs a handover, the base station 100-1 stores type information indicating the handover, date and time of the handover, the unique identification number of the wireless terminal 400, the unique identification number of the base station 100-1 as a handover source, and a unique identification number of a base station (e.g., the base station 100-2) as a handover target in the first table 221. In this way, the history of attach, detach, and handover of the wireless terminal 400 is accumulated in the first table 221.

Here, as another example, an operation of storing the unique identification number of the base station 100-2 as the handover target in the first table 221 may be performed by the base station 100-2 as the handover target. Further, as another example, when attach, detach, or handover is performed, an apparatus in the radio access network other than the base stations 100-1 and 100-2 performs corresponding processing, and thus the apparatus other than the base stations 100-1 and 100-2 may store the above-described information in the first table 221. For example, the server 175 may store the above-described information in the first table 221.

Although the operation of the base station 100-1 storing information in the first table 221 has been described, other base stations 100 (the base stations 100-2, 100-3) operate in a similar way.

The following will describe the operation where the server 115 (the server function unit 145) of the base station 100-1 stores information in the second table 222. The server 115 of the base station 100 communicates with other servers (e.g., the server 125, the server 135, the server 175, and the server 950 as will be described later) and stores the time spent for response (response time of communication) in the second table 222. For example, the server 115 stores an identification number of a base station or server and time spent for responding to a communication in the second table 222 in association with the identification number of itself.

The server 115 similarly stores time spent for responding to a communication for each of all servers of connectable base stations.

The server 115 of the base station 100-1 stores time spent for inputting and/or outputting between its own elements in the second table 222. For example, the server 115 stores, in the second table 222, in association with its own identification number, time spent for inputting and/or outputting between its own elements.

The server 115 of the base station 100-1 measures a processing speed of its own elements and stores the processing speed in the second table 222. For example, the server 115 stores the measured processing speed of elements in association with its own identification number in the second table 222.

Note that the server 115 of the base station 100-1 can update time spent for responding to a communication, time spent for inputting and/or outputting between elements, and the processing speed of elements, for example, at a certain time interval. The servers of all the base stations 100 in the system 1 similarly store the above-described information in the second table 222. The server 175 of the upper node 300 may similarly store the above-described information in the second table 222. Further, the server 950 in the radio access network described later may similarly store the above-described information in the second table 222.

The following will describe an operation of the database apparatus 200.

The database apparatus 200 (the database management unit 233), for example, periodically refers to date and time information (occurrence date and time of attach, detach, and handover) stored in the first table 221 and deletes a record of which time elapsed until present time exceeds a predefined threshold (that is, an old record). Note that the server 175 may delete the above-described record in the first table 221 of the database apparatus 200. In another example, the server 115 of the base station 100-1 to which the wireless terminal 400 is connected may delete the above-described record in the first table 221. Alternatively, a server of a base station other than the base station 100-1 (e.g., the server 125 or the server 135) may delete the above-described record in the first table 221. Otherwise, the server 950 in the radio access network described later, may delete the above-described record in the first table 221.

The following will describe an operation of the server 175 of the upper node 300. The operation of the server 175 described below may alternatively be performed by the server 115 of the base station 100-1 to which the wireless terminal 400 is connected, or a server of a base station other than the base station 100-1 (e.g., the server 125 or the server 135). Alternatively, the operation of the server 175 described below may be performed by the server 950 described later, provided in the radio access network.

First, an operation will be described where the server 175 statistically processes a history of connections between a certain wireless terminal 400 and the base stations 100 by referring to the first table 221 in the database apparatus 200. The server 175 statistically processes the history in the database apparatus 200 and calculates statistics on to which base station and the number of times each wireless terminal has been connected to (a first calculation result). For example, for each identification number of a wireless terminal stored in the first table 221, the number of times of connections with each base station is counted. The number of times of connections with each base station can be calculated, for example, by referring to the number of times of attach and the number of times of handover.

The server 175 statistically processes the history in first table 221 in the database apparatus 200 and calculates statistics on source base stations and target base stations such as from which base station and to which base station a specific wireless terminal has moved (a second calculation result). For example, it is possible to know from which base station and to which base station a wireless terminal has moved by referring to an identification number of a base station as a handover source and an identification number of a base station as a handover target in the first table 221.

The server 175 statistically processes the history in the first table 221 of the database apparatus 200 and derives from which base station and to which base station wireless terminals other than the specific wireless terminal have moved (a third calculation result).

The above-described statistics may include statistics per month, per date, per day of week, per holiday, or per time slot, based on the date and time information in the first table 221. As another example, the statistics may be derived for a predetermined area including coverage areas of a plurality of base stations.

Figure 14:
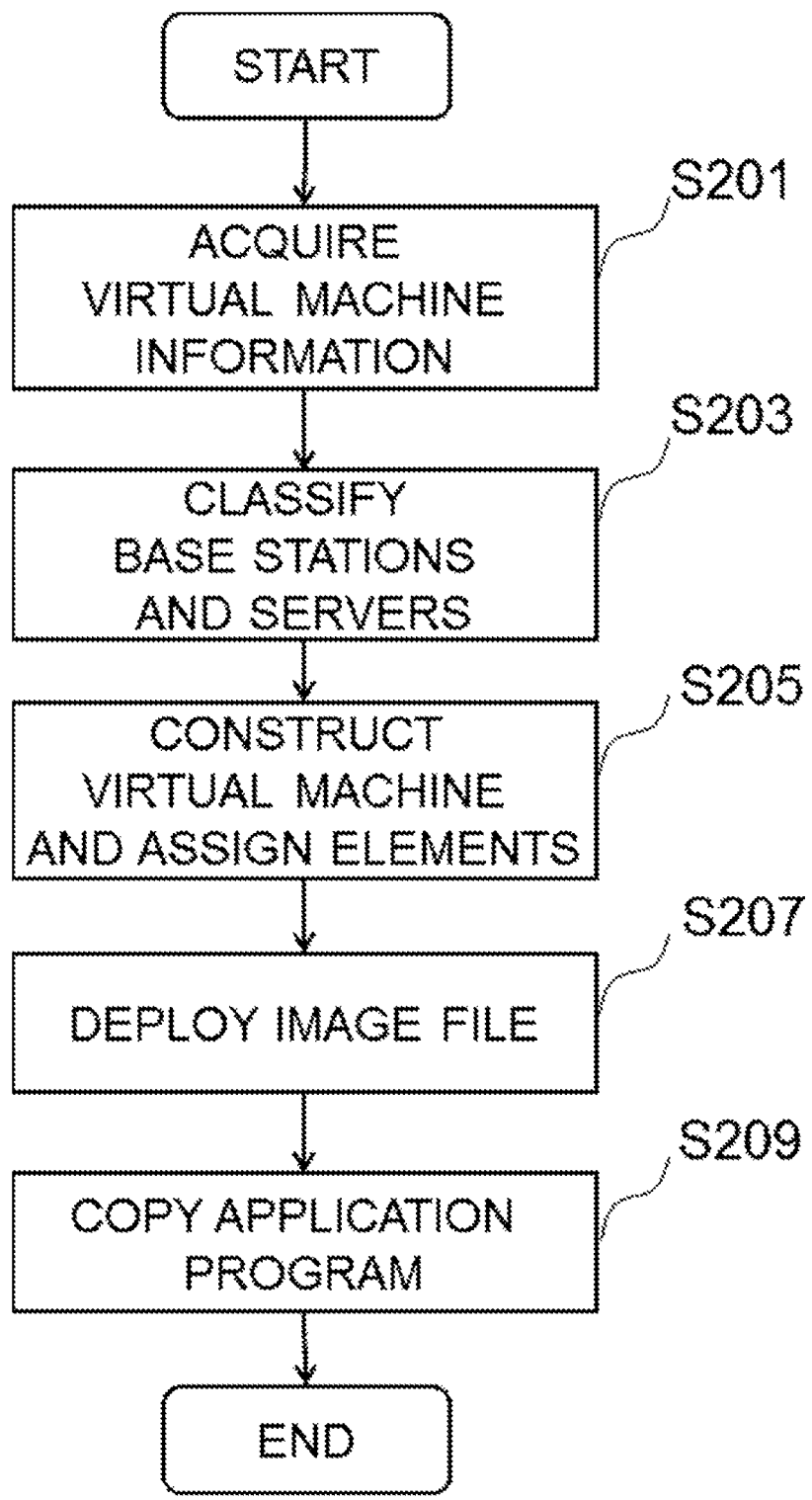
FIG. 14 is a flowchart for describing assignment of the virtual machine according to the first example embodiment.

When the wireless terminal 400 attaches to the base station (e.g., the base station 100-1), the server 175 assigns the virtual machine 600 for the wireless terminal 400. The following will describe the operation of assigning the virtual machine 600 for the wireless terminal 400 in detail. FIG. 14 is a flowchart for describing assignment of the virtual machine according to the first example embodiment.

First, as step 1, the server 175 determines a configuration of the virtual machine 600 (S201). For example, the server 175 refers to the third table 223, specifically, refers to records (rows) corresponding to the unique identification number of the wireless terminal 400, and obtains information of a virtual machine for assignment (the maximum value and minimum value of the number of elements and the maximum value and minimum value of a shared memory capacity, and the like).

Next, as step 2, the server 175 classifies the base stations 100 and the servers in the base stations 100 (S203). The following will describe the classification.

The server 175 classifies the first base station to which the wireless terminal 400 is connected (e.g., the base station 100-1 or the server 115 in the base station 100-1) as Category 1. For example, the server 175 may refer to the first table 221 and identify the base station 100-1 (the server 115) to which the wireless terminal 400 is connected.

The server 175 classifies, as Category 2, a second base station (e.g., the base station 100-2 or the server 125 in the base station 100-2) that can be a target (a handover target) to which the wireless terminal 400 may move from the base station 100-1 of Category 1, from the third calculation result. For example, the server 175 may refer to the first table 221 and identify a base station (a server) that may be a mobility target (a handover target) from the base station 100-1. Here, for example, Category 2 includes base stations to which a handover has ever performed from a base station to which the wireless terminal 400 is currently connected (e.g., any wireless terminal has performed a handover in the past).

The server 175 classifies a base station 100 (a server) to which the wireless terminal 400 has ever been connected as Category 3, based on the above-described first calculation result. For example, the server 175 may refer to the first table 221 and identify a base station 100 (a server) to which the wireless terminal 400 has ever been connected.

The server 175 compares the above-described second calculation result and third calculation result. Then, the server 175 classifies, as Category 4, a base station (a server)

that has not been a mobility target of the wireless terminal 400 from the base station of Category 1 but may be a mobility target of other wireless terminals from the base station of Category 1. Note that Categories 1 to 4 relate to mobility or a handover of the wireless terminal 400, and servers that belong to Categories 1 to 4 are, for example, servers in the base stations 100 (e.g., the servers 115, 125 and 135). On the other hand, servers that belong to Categories 5 to 9 described below may include not only servers in the base stations 100 but also the server 175 in the upper node 300.

The server 175 refers to the second table 222 and classifies, as Category 5, a server (a base station) of which response time with the base station 100-1 of Category 1 is less than a time threshold. The time threshold can be defined in advance. The time threshold may be stored in an arbitrary table and acquired from the table in the above-described step 1.

The server 175 classifies, as Category 6, a server (a base station) that does not belong to Category 2 among the servers (the base stations) of Category 5. The server (the base station) of Category 6 is not likely to be a handover target of the wireless terminal 400. Thus, the server (the base station) of Category 6 is characterized in being not easily affected by a handover of the wireless terminal 400. Further, the response time of communication of the server (the base station) of Category 6 from the base station 100-1 to which the wireless terminal 400 is connected is less than a threshold and thus, the server (the base station) of Category 6 is not easily affected by communication delay.

The server 175 classifies, as Category 7, a server (a base station) that does not belong to Category 3 among the servers (the base stations) of Category 6. The base station of Category 7 is unlikely to be connected from the wireless terminal 400. Thus, the server (the base station) of Category 7 is characterized in being not easily affected by the wireless terminal 400. Further, the response time of communication of the server (the base station) of Category 6 from the base station 100-1 to which the wireless terminal 400 is connected is less than a threshold, and thus, the server (the base station) of Category 7 is not easily affected by communication delay.

The server 175 classifies, as Category 8, a server (a base station) that does not belong to Category 4 among the servers (the base stations) of Category 7. The server (the base station) of Category 8 is unlikely to be a handover target of any terminals that are connected to the base station 100-1. Thus, the server (the base station) of Category 8 is not easily affected by operations of the base station 100-1 and the server 115.

The server 175 classifies, as Category 9, a server (a base station) that does not belong to any of Categories 1 to 8.

Note that the above-described classification is an example. Other than the above-described classification, more abstract or finer classification may be used. Statistical calculation may be performed as necessary based on the first to third tables and classification may be performed as necessary according to the result of the statistical processing. For example, how often the wireless terminal 400 has made connection or ratio of the connection may be calculated by statistical processing based on the information in the first table 221, and finer classification may be done based on the result.

Next, as step 3, processing where the server 175 of the wireless terminal 400 and the servers of the base stations 100 configure the virtual machine 600 of FIG. 8 (S205) will be described.

The server 175 can determine categories for selecting servers for assignment or the order of priorities of categories for selecting servers for assignment depending on functionality of the virtual machine 600. The following description is an example of assignment processing for the input function 801.

The server 175, first, selects a target to which an element for performing the input function 801 is assigned from the servers of Category 1. The server 175 refers to the second table 222 and checks if there are resources available for a server to be assigned. When there are not sufficient resources available (e.g., the amount of resources is less than a predefined threshold), a target to which an element is assigned is selected from the servers of Category 2 and the resources are checked in a similar way. When the resources of Category 2 are insufficient, a server of another category is selected and the resources are checked in a similar way. Note that when there is another server in the same category, the server of the same category may be selected before proceeding to a next category. When the second table 222 is referred to and there are available resources (e.g., the amount of resources is more than a predefined threshold), the server 175 instructs assignment of the input function to the selected assignment target server.

The server which received the instruction executes a program for running the input function 801 by using an unused element (emulator).

In a similar way, the server 175 assigns elements of the distribution function 802, computing function 803, aggregate function 804, output function 805, execution control function 806, and shared memory function 807.

Note that the server 175 assigns elements so that the elements of the above-described plurality of functions are distributedly performed by at least a plurality of servers.

The server 175 can determine, for example, from which category a server is selected for assigning an element or which category to be prioritized (that is, the order of priority) depending on the information obtained from steps 1 and 2. For example, the communication delay from the base station 100-1 is less than a threshold for the server of Category 5, and thus, the virtual machine 600 satisfying a range of processing delay configured in the third table 223 can be constructed by selecting elements from the servers of Category 5.

Figure 12:
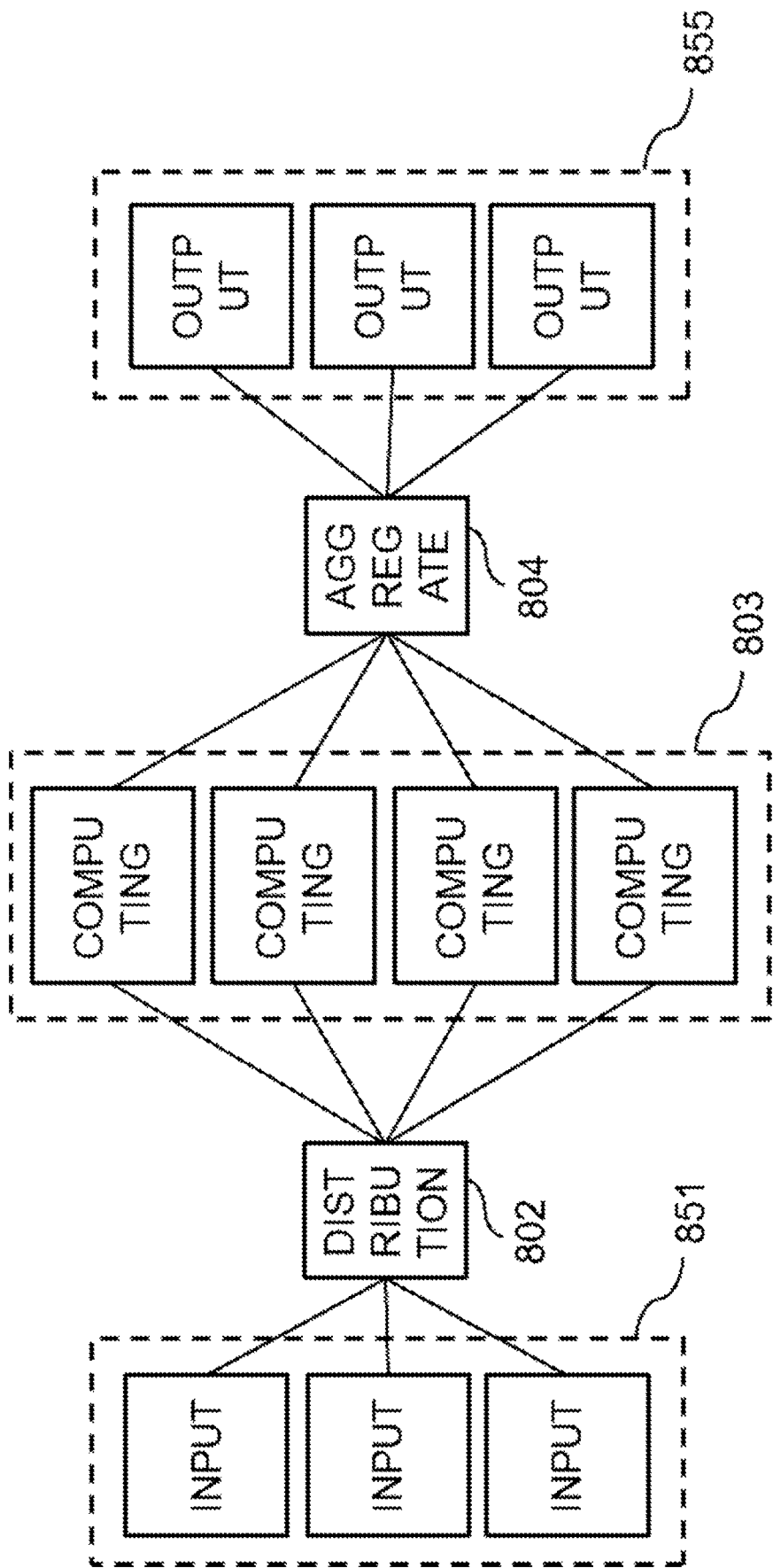
FIG. 12 is a diagram illustrating an example of functions and a connection structure of the functions.

Note that, for example, based on the information obtained at step 1, the server 175 determines the number of elements to be assigned, determines the number of functions of the virtual machine 600, and determines a connection structure among the functions. FIG. 12 is a diagram illustrating an example of the connection structure among the functions. To simplify descriptions, illustration of the execution control function 806 and the shared memory function 807 and connections of those with other functions are omitted in FIG. 12.

The server 175 determines the number of elements to be assigned, for example, based on the maximum value and minimum value of the number of elements, the parameter of parallel processing, and the redundancy parameter that are obtained from the third table 223 at step 1.

For example, the server 175 assigns one element from Category 1 and two elements from Category 2 to each of the input function 851 and the output function 855. In this way, at least a part of a plurality of functions of the virtual machine 600 (in this example, the input function 851 and the output function 855) may be assigned to a first base station (e.g., the base station 100-1) to which a wireless terminal apparatus (e.g., the wireless terminal 400) is connected and a second base station (e.g., the base station 100-2) to which a handover has ever performed from the first base station. As such, an advantage will be obtained that, even when the wireless terminal 400 performs a handover from a base station of Category 1 to a base station of Category 2, increase in processing delay can be prevented.

The execution control function 806, shared memory function 807, and computing function 803 may also be constituted by a plurality of elements, which are synchronized and executed in parallel thereby obtaining a similar advantage. The distribution function 802 and aggregate function 804 may also be constituted by a plurality of elements, at least a part of which may be synchronized and executed in parallel.

In another example, the server 175 increases or decreases the number of elements to which the computing function 803 is assigned. In this way, an advantage that computing processing capability can be scaled (increased or decreased) will be obtained. In another example, the server 175 increases or decreases the number of elements to which the shared memory function 807 is assigned. In this way, an advantage that a storage capacity can be scaled (increased or decreased) will be obtained. In still another example, each function may take a redundancy configuration, such as duplication or clustering. In this way, an advantage to improve availability can be obtained.

Next, as step 4, the server 175 deploys an image file (a disk image) onto the constructed virtual machine 600 (S207). The format of the image file can be a format such as an ISO image that is specified by the International standardization organization (ISO). The image file includes the guest OS 732 to be used by the wireless terminal 400. The image file is, for example, in the server 175. Alternatively, the image file may be in a file server 960 described later, that is accessible from the server 175. The image file may be distributed among servers, other than the server 175, such as the server 115, the server 125, the server 135, and the server 950.

Further, the server 175 includes a plurality of image files depending on the types of guest OS 732. In another example, the server 175 includes the guest OS 732 for each wireless terminal. Which one of a plurality of image files is deployed may be determined based on any appropriate information obtained at step 1.

As step 5, the server 175 copies files of the application program to the virtual machine 600 (S209). In another example, the image file includes the files of the application program and steps 4 and 5 may be realized in one step. The files of the application program is in the server 175. Alternatively, the files of the application program is in the file server 960 described later, that is accessible from the server 175. Otherwise, servers other than the server 175, such as the server 115, the server 125, the server 135, and the server 950, may distributedly store the files of the application program.

The server 175 include a plurality of files depending on the types of the application program. In another example, the server 175 may include a file for each wireless terminal. An example of a file for each wireless terminal is, for example, a file of configuration data that is necessary for execution of the application. Which one of a plurality of files is deployed may be determined based on any appropriate information obtained at step 1.

Figure 15:
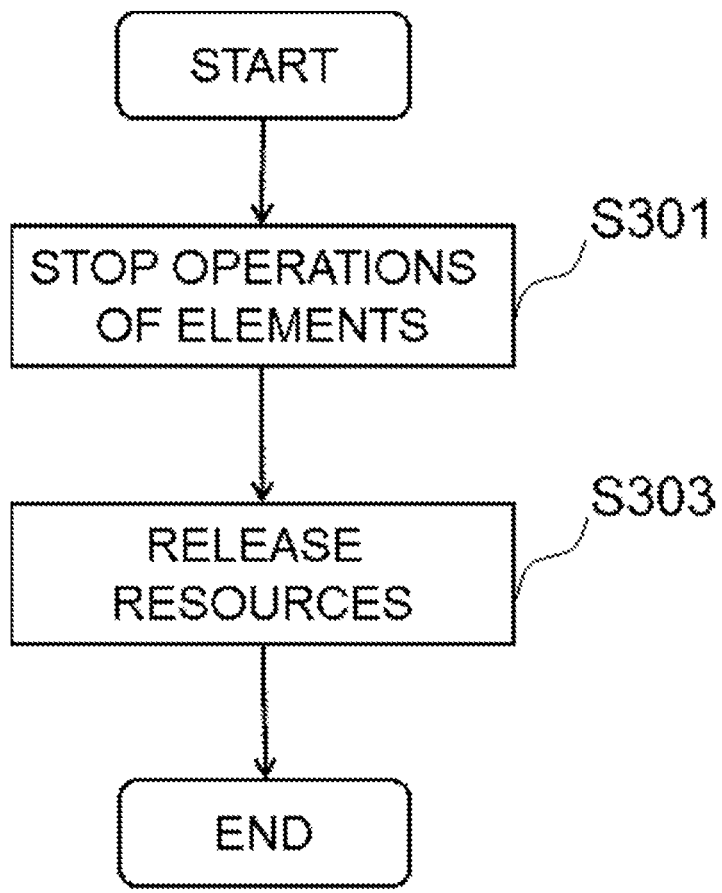
FIG. 15 is a flowchart for describing an operation when the wireless terminal detaches according to the first example embodiment.

The processing when the wireless terminal 400 detaches will be described. FIG. 15 is a flowchart for describing an operation when the wireless terminal 400 detaches according to the first example embodiment. When the wireless terminal 400 detaches, the server 175 communicates with the servers constituting the virtual machine 600 to stop the operation of each element (S301). The server 175 stops the operation of each element to make the element unused element and releases the resources (S303). Note that the server 175 may release the resources after predetermined time has elapsed since the wireless terminal 400 detaches. When the wireless terminal 400 re-attaches within predetermined time, the constructed virtual machine 600 may be reused.

The following will describe processing when the wireless terminal 400 performs a handover. More specifically, operations where the server 175 changes the configuration of a virtual machine when the wireless terminal 400 performs a handover will be described.

Figure 16:
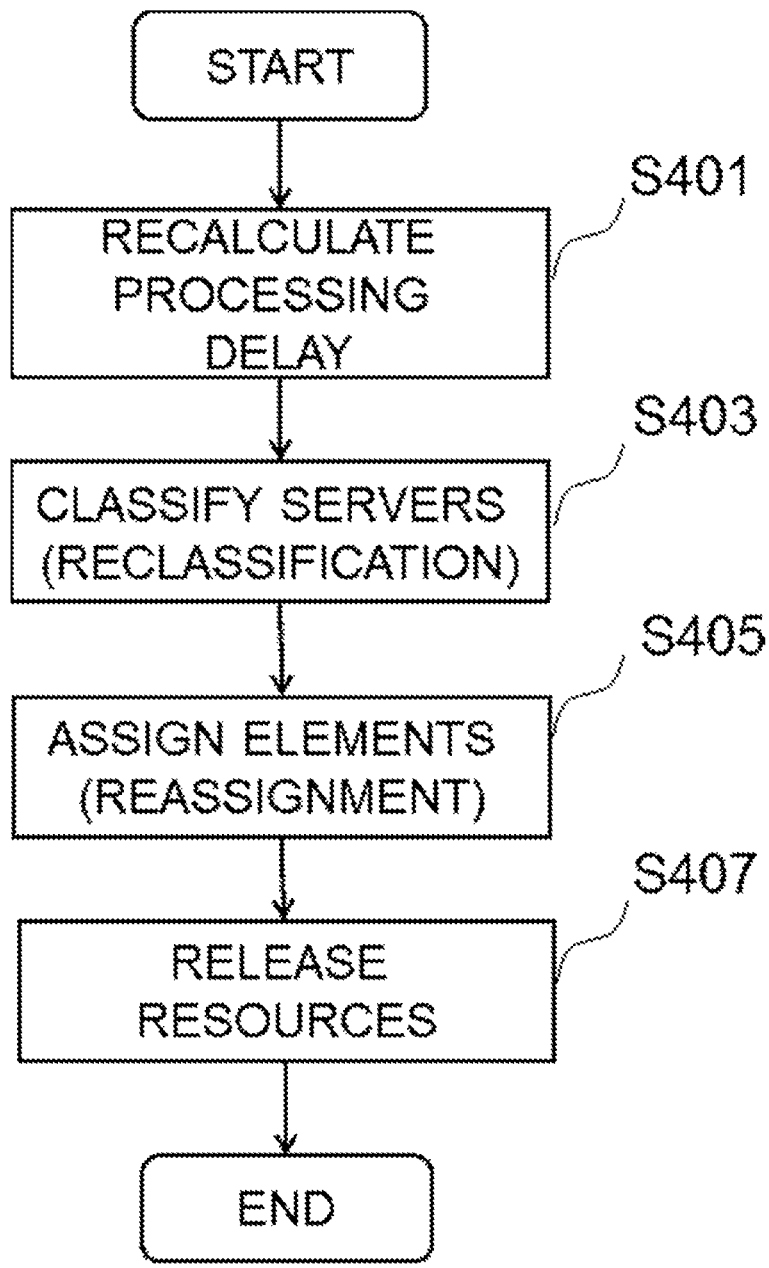
FIG. 16 is a flowchart for describing an operation when the wireless terminal performs a handover according to the first example embodiment.

FIG. 16 is a flowchart for describing an operation when the wireless terminal 400 performs a handover according to the first example embodiment. When a handover of the wireless terminal 400 occurs, the server 175 recalculates processing delay of the virtual machine 600 (S401). Calculation of processing delay is similar to the above-described calculation and, when processing delay time satisfies setting in the third table 223 (e.g., the maximum value and minimum value of processing delay), the server 175 may not change the configuration of the virtual machine 600. On the other hand, when processing delay time does not satisfy the setting in the third table 223 (e.g., the maximum value and minimum value of processing delay), the server 175 classifies the base stations and the servers of the base stations for the wireless terminal 400 (S403). That is, step 2 is performed again.

Next, the server 175 examines the categories of already-assigned elements in accordance with the new classification and detects an element that is out of the rule of selection (assignment) as described in the processing for configuring the virtual machine 600 (step 3 above). The server 175 additionally assigns one or a plurality of elements to the function of the element that is out of the rule (S405). In this way, the virtual machine 600 is enabled to synchronize and execute in parallel the functions (the added elements). The server 175 separates the element that is out of the rule from the virtual machine 600 and releases the resource as unused element (S407). Note that, as another example, this operation may be performed periodically without limitation to when the wireless terminal 400 performs a handover.

<2.7. Summary>

The first example embodiment has been described above. According to the first example embodiment, an application program can be performed by using servers of base stations and/or radio access network apparatuses (node apparatuses) that include a CPU with higher performance than that of the wireless terminal and a memory with larger capacity than that of the wireless terminal. In this way, a more advanced application program can be performed even with a low-cost wireless terminal.

Further, servers constituting a virtual machine can be changed in response to a handover of a wireless terminal so that processing delay is kept small. In this way, even when the wireless terminal performs a handover, increase in delay in application processing or communication can be suppressed.

Further, required performance of a virtual machine, type of a guest OS and type of an application can be obtained by referring to a database by using an identification number unique to a terminal as a key, and a virtual machine can be constructed and assigned to the wireless terminal, based on the obtained information. In this way, performance of a virtual machine for performing an application program of a wireless terminal, the type of its guest OS, and the type of an application can be changed per wireless terminal.

Further, the functions of a virtual machine are implemented with a plurality of programs of a plurality of servers, and the configuration of the virtual machine can be freely changed. In this way, performance, memory capacity, and availability of a virtual machine for running an application program for a wireless terminal can be flexibly changed.

Further, a database stores information of base stations to which a wireless terminal has attached and servers to be used can be assigned on the basis of this information. Thus, finite resources in a radio access network can be appropriately assigned to services. In addition, the system of the first example embodiment is economically efficient.

3. Second Example Embodiment

<3.1. Configuration of System>

Figure 17:
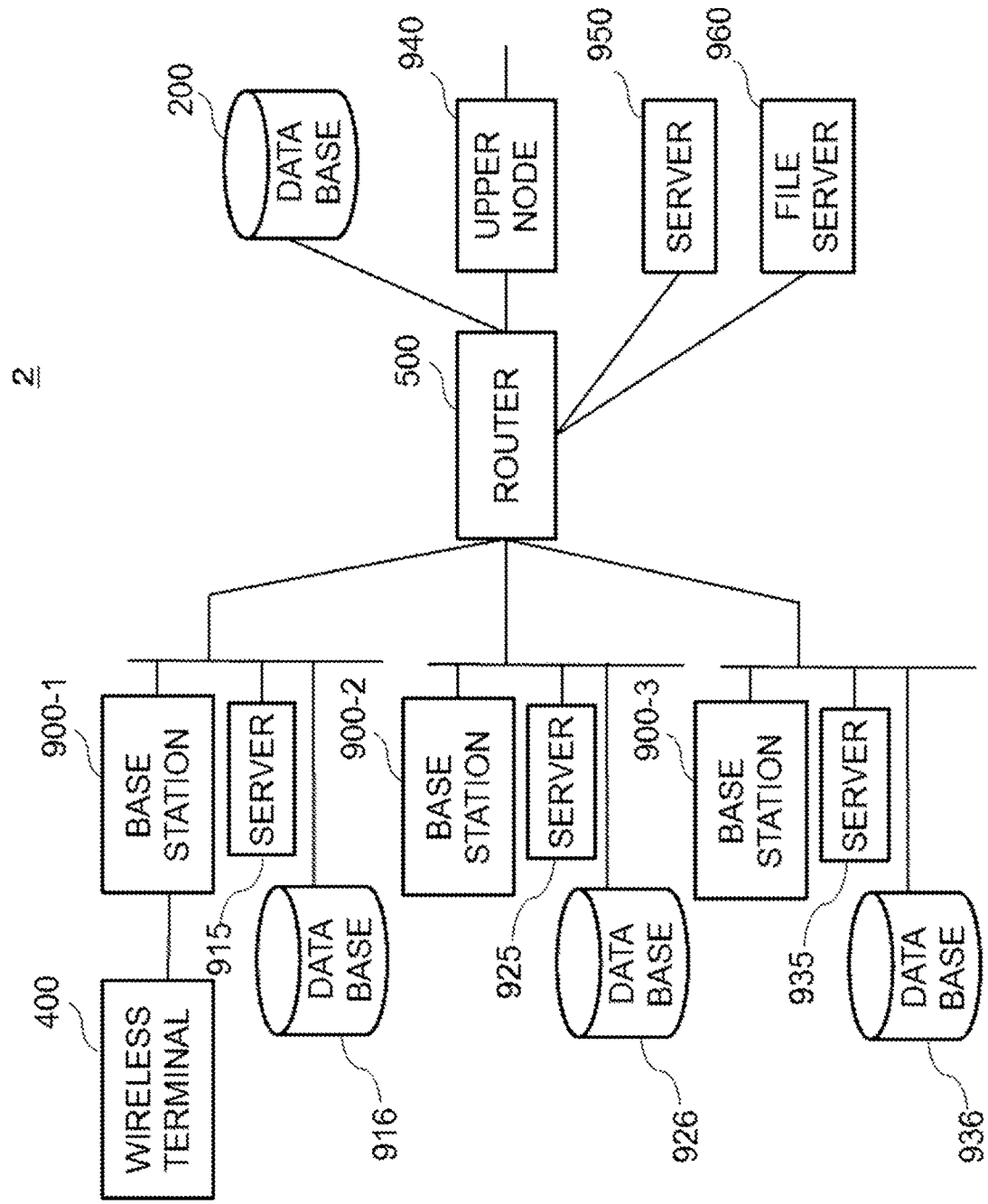
FIG. 17 is an explanatory diagram illustrating an example of a schematic configuration of a system according to a second example embodiment.

Next, with reference to FIG. 17, a second example embodiment of the present invention will be described. FIG. 17 is an explanatory diagram illustrating an example of a schematic configuration of a system 2 according to the second example embodiment.

The system 2 according to the second example embodiment includes for example, a plurality of base stations 900, a plurality of servers (servers 915, 925, 935, 950), a plurality of database apparatuses (database apparatuses 916, 926, 936, 200), an upper node (a core network node) 940, a file server 960, and a router 500.

In the second example embodiment, as illustrated in FIG. 17, the servers may be configured in different apparatuses than the base stations 900. The base stations and the servers are connected and capable of communicating with each other. Further, the upper node 940 and the file server 960 are connected and capable of communicating with each server through the router 500. Note that the base station 900-1 and the server 915 may be associated with each other in advance, the base station 900-2 and the server 925 may be associated with each other in advance, and the base station 900-3 and the server 935 may be associated with each other in advance. For example, the servers 915, 925 and 935 are constituted by apparatuses other than the base stations 900 but may operate in a similar manner to the servers in the base stations according to the first example embodiment.

As illustrated in FIG. 17, the databases 916, 926, 936 may be equipped for respective base stations 900. A synchronization operation may be performed so that the first to third tables in the plurality of databases include the same content. Alternatively, the tables may be distributed among the plurality of databases, and the tables may be related to one another so that each apparatus can refer to the tables.

<3.2. Configuration of Base Station>

The configuration of the base stations 900 (the base stations 900-1, 900-2, 900-3) is similar to that of the base stations 100 of the first example embodiment as described with reference to FIG. 2 except for omission of the server function unit 145, thus, overlapping descriptions will be omitted.

<3.3. Configuration of Data Base Apparatus>

The configuration of the database apparatus 200 is similar to the configuration of the database apparatus 200 of the first example embodiment as described with reference to FIG. 3, thus, overlapping descriptions will be omitted. Note that, as described above, the information stored in the database apparatus 200 according to the first example embodiment may be stored in either one of the database apparatuses 916, 926, 936, and 200 of the second example embodiment.

<3.4. Configuration of Upper Node>

The configuration of the upper node 940 is similar to the configuration of the upper node 300 of the first example embodiment as described with reference to FIG. 4, thus, overlapping descriptions will be omitted.

<3.5. Configuration of Wireless Terminal>

The configuration of the wireless terminal 400 is similar to the configuration of the wireless terminal 400 of the first example embodiment as described with reference to FIG. 5, thus, overlapping descriptions will be omitted.

<3.6. Technical Features>

The processing of each apparatus is similar to corresponding processing according to the above-described first example embodiment.

4. Third Example Embodiment

Next, with reference to FIGS. 18 and 19, a third example embodiment of the present invention will be described. The above-described first example embodiment is a concrete example embodiment, whereas the third example embodiment is a more generalized example embodiment.

<4.1. Configuration of System>

Figure 18:
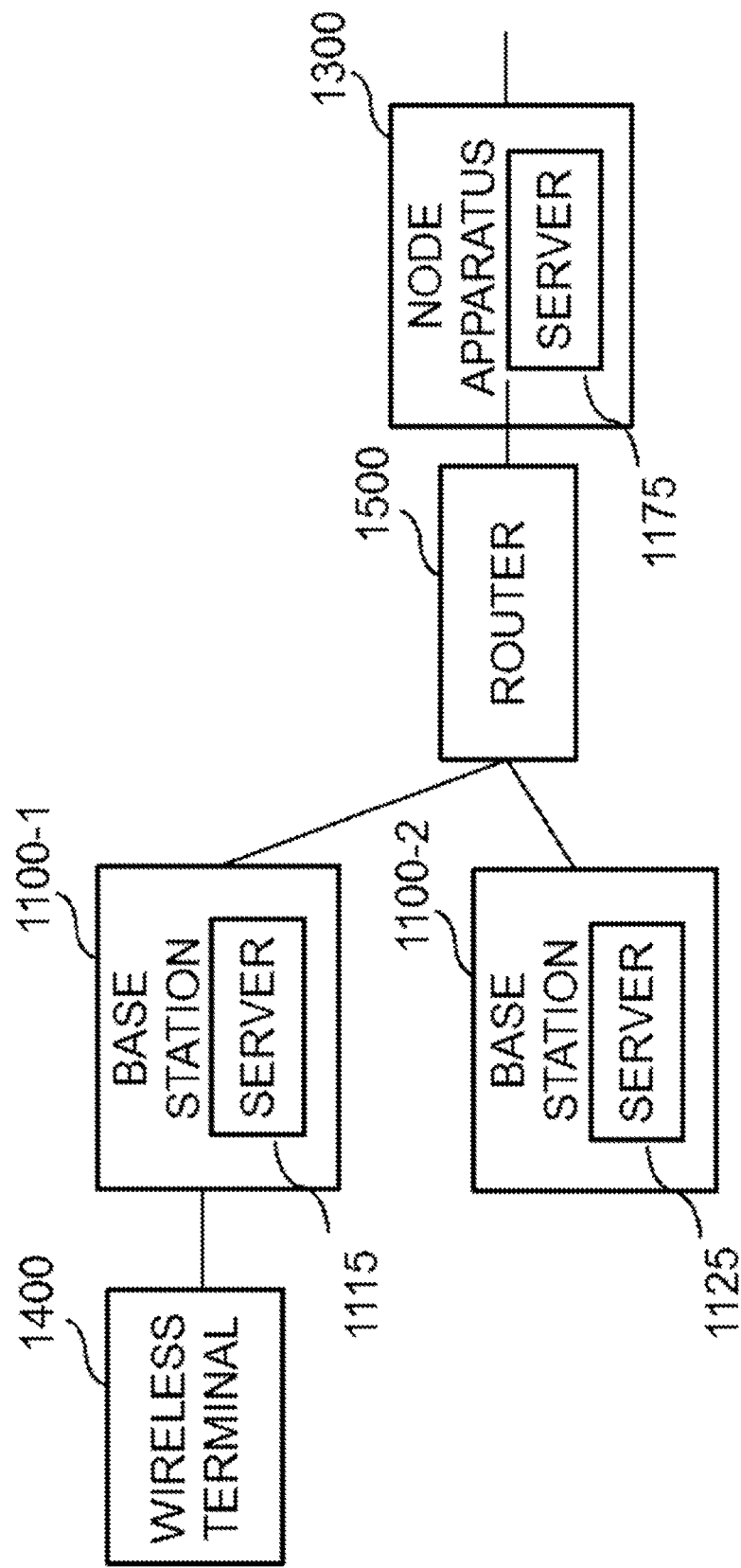
FIG. 18 is an explanatory diagram illustrating an example of a schematic configuration of a system according to a third example embodiment.

With reference to FIG. 18, an example of a configuration of a system 3 according to the third example embodiment will be described. FIG. 18 is an explanatory diagram illustrating an example of a schematic configuration of the system 3 according to the third example embodiment.

The system 3 includes a plurality of network apparatuses. For example, the system 3 includes one or a plurality of base stations 1100 and a node apparatus (an upper node or a core network node) 1300 as the plurality of network apparatuses. Further, the system 3 may include a router 1500. In the system 3, one of the base stations or the node apparatus 1300 may be omitted. In the following description, when it is not particularly necessary to distinguish between the base stations, the base stations may be collectively referred to as the base stations 1100. The system 3 may also be referred to as a communication system. Also, a system constituted by the plurality of base stations 1100 may, in some cases, be referred to as a communication system or a base station system. Each of the base stations 1100, the upper node 1300, and the servers may, in some cases, be referred to as a network apparatus.

The base stations 1100 (e.g., a base station 1100-1, a base station 1100-2, and the like) communicate with one another through the router 1500. The base stations 1100 communicate with the upper node 1300 through the router 1500.

For example, the system 3 is a system that conforms to 3GPP standards. More specifically, the system 3 may be a system that conforms to LTE/LTE-Advanced and/or System Architecture Evolution (SAE). Alternatively, the system 3 may be a system that conforms to fifth generation (5G) standards or Universal Mobile Telecommunications System (UMTS) that conforms to third generation (3G) standards. The system 3 is, of course, not limited to these examples.

<4.2. Configurations of Base Station and Wireless Terminal>

The configurations of the base station 1100 and a wireless terminal 1400 are similar to the configurations in the first example embodiment, thus, descriptions thereof are omitted.

<4.3. Configuration of Upper Node>

Figure 19:
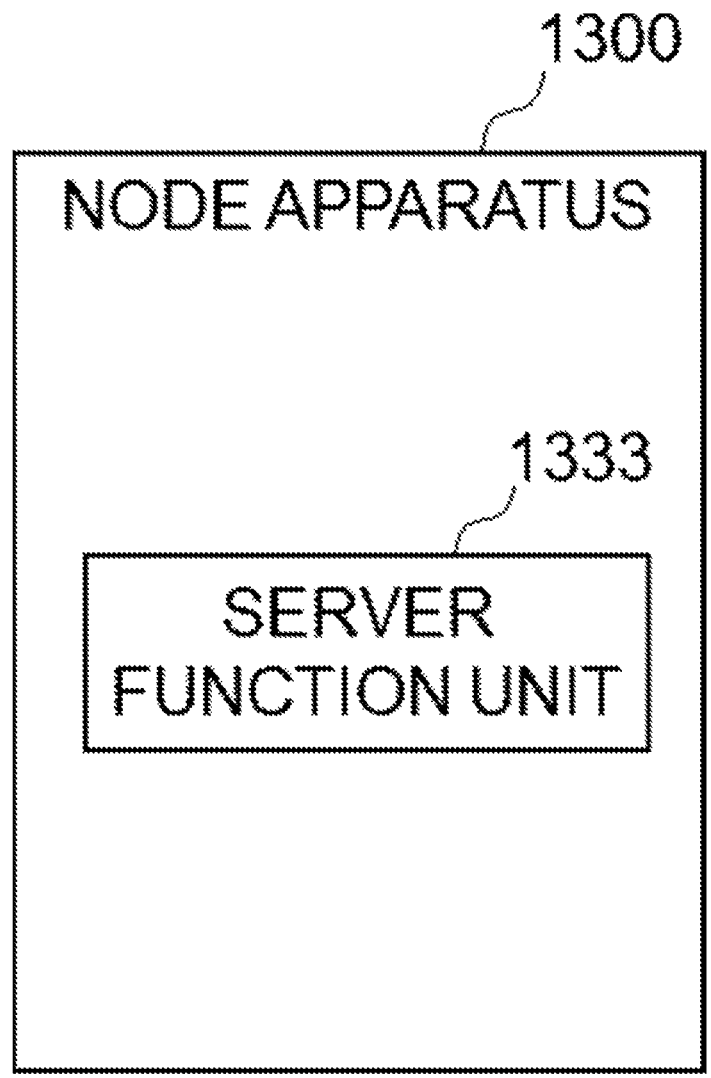
FIG. 19 is a block diagram illustrating an example of a schematic configuration of an upper node according to the third example embodiment.

FIG. 19 is a block diagram illustrating an example of a schematic configuration of the upper node 1300 according to the third example embodiment. With reference to FIG. 19, the upper node 1300 includes a server function unit 1333. The server function unit 1333 runs a part of functions of a virtual machine that executes an application program for the wireless terminal 1400. Further, the server function unit 1333 assigns the functions of the virtual machine that executes the application program for the wireless terminal 1400 to the servers in the system 3.

The server function unit 1333 may be implemented with a processor or the like. The upper node 1300 may include a memory that stores a program and one or more processors that can execute the program. The one or more processors may perform operations of the server function unit 1333. The above-described program may be a program for causing the processor(s) to perform the operations of the server function unit 1333.

<4.4. Technical Features>

The following will describe the technical features of the third example embodiment.

In the third example embodiment, the base stations 1100 are assigned with functions each being a part of the plurality of functions of the virtual machine executing the application program for the wireless terminal apparatus 1400, and is configured to execute the assigned functions. Here, the plurality of functions of the virtual machine are distributedly executed by the plurality of base stations.

The server function unit 1333 of the node apparatus 1300 distributedly assigns the plurality of functions of the virtual machine that executes the application program for the wireless terminal 1400 to the plurality of base stations 1100. Here, the server function unit 1333 assigns the plurality of functions of the virtual machine to the plurality of base stations 1100, at least based on history information of handovers among the plurality of base stations 1100. The other operations of the base stations 1100 and the upper node 1300 are similar to the operations in the first example embodiment. Note that information stored in the database apparatus 200 in the first example embodiment is stored in the base stations 1100 and the upper node 1300 and can be referred to.

The third example embodiment has been described above. According to the third example embodiment, for example, the wireless terminal can perform the application program by using resources of other apparatuses.

5. Example Alterations

Example alterations of the above-described example embodiments will be described. Although the reference signs in the first example embodiment will be used in the following description, each example alteration can also be applied to the second and third example embodiments.

The server may generate elements corresponding to functions. Examples of such elements include an interface element specifically arranged for performance of inputting and/or outputting data, a computing element specifically arranged for performance of computing processing, and a memory element specifically arranged for performance of a memory function.

The server 175 of the upper node 300 may also generate elements in a similar way that the server 115 of the base station 100-1 and the like generates elements.

One element may perform a plurality of functions. For example, the input function 801 and the output function 805 may be constituted by one element. Likewise, the input function 801 and the distribution function 802 may be constituted by one element.

The first table 221 may store information indicating a reason (factor, trigger) for occurrence of attach, detach, and handover. Examples of the stored information indicating the reason includes a manual operation, movement by a user, program processing by a terminal, a failure of a wireless terminal, a change in transmission/reception circumstance of radio waves, a network failure, and powering down of the wireless terminal.

The first table 221 may include information that can specify cells to which the wireless terminal has visited (including a column indicating a unique identification number of the cells). For example, the first table 221 may include a column indicating a unique identification number of the cell to which the wireless terminal has visited. This example alteration may be applied to a case where a single base station can form a plurality of cells. The first table 221 can store information indicating that a handover has been performed from a cell to another cell, both cells being served by the same base station.

The table of the database apparatus 200 may further include position information of the base stations 100. For example, in association with a unique identification number of the base station, information indicating longitude, latitude, altitude, and coordinates in a space, or information indicating coordinates underground or undersea where the base station 100 is located may be included. Taking into account a movable base station 100, such information may be associated with date and time information when the base station 100 was located at a position indicated by the position information.

The table of the database apparatus 200 may further include position information of the wireless terminal 400. For example, in association with a unique identification number of the wireless terminal and date and time when the wireless terminal 400 was located at the position, information indicating longitude, latitude, altitude, and coordinates in a space, or information indicating coordinates underground or undersea or the like may be included. The table of the database apparatus 200 may include information that can specify a coverage of a cell. For example, such information includes a distance from the base station 100 to a cell boundary, a direction and range of beam, longitude and latitude, output power and/or the like.

The table of the database apparatus 200 may include information that can specify an owner or an operator of the base station 100. The table of the database apparatus 200 may include information for specifying a cell where the wireless terminal 400 has attached, detached, or performed a handover. This can be used for a case where a single base station 100 forms a plurality of cells. A table of the database apparatus 200 may include subscriber information of the wireless terminal 400, such as, the type of a contracted service, a group to which a user of the terminal belongs, and whether the subscriber is subject to prioritized communication control.

Note that the above-described information may be stored in any one of the first table 221, second table 222, and third table 223 of the database apparatus 200, or in another table.

Further, a single virtual machine 600 may be assigned to a plurality of wireless terminals 400. A plurality of virtual machines 600 may be assigned to a single wireless terminal 400.

As another example of classification of step 2, a logical NOT of a condition for an arbitrary category may be used for a condition to classify for a further category. Alternatively, logical OR or other logical operations (AND, NOR, NAND, XOR, or the like) between conditions for a certain category and another category may be used for a condition to classify for a still another category.

While an example where the database apparatus 200 includes three types of tables 221, 222, and 223 has been described in the first example embodiment, the database apparatus 200 may include four or more types of tables. FIG. 20 is an explanatory diagram of a fourth table 224. For example, the database apparatus 200 includes the fourth table 224 where the fourth table 224 is a table indicating a history of applications performed by the wireless terminal 400. The fourth table 224 includes, for example, the following information elements (columns, fields).
Unique identification number of the wireless terminal 400.
Type of performed application.
Date and time when processing of the application started.
Date and time when processing of the application ended.
Position information of the wireless terminal 400.

FIG. 21 is an explanatory diagram of a fifth table 225. For example, the database apparatus 200 includes the fifth table 225. The fifth table 225 includes, for example, the following information elements (columns, fields).
Unique identification number of the wireless terminal 400.
Date and time when the virtual machine 600 is constructed.
Processing delay time (maximum value, minimum value, average value) of the virtual machine 600.
Information specifying the configuration of the virtual machine 600.

Note that the information specifying the configuration of the virtual machine 600 includes the following information elements (columns, fields).
Unique identification number of a server.
Processing function part that an element of the server performs.

The servers may refer to the fifth table 225 to construct virtual machines of the same configuration.

Further, statistical processing on database information may be done for any table other than the first table 221. The statistical processing can be executed for each segment of subscriber group, type of contracted service, and executed application, then, information can be summarized and analyzed for each segment.

The server may calculate the movement speed of the wireless terminal 400 by statistical processing. For example, the movement speed may be calculated from two or more examples (coordinates of two points or more) of longitude, latitude, and altitude stored as described above in the table of database apparatus. This information is stored in association with the identification number of the wireless terminal 400 and the date and time when the wireless terminal 400 was located at the position indicated by the position information. Further, the server can calculate the movement speed of the wireless terminal 400 from date and time when the wireless terminal 400 performed a handover from a cell A to a cell B, date and time when the wireless terminal 400 performed a handover from the cell B to a cell C, and information that can specify the cell coverage of the cell B (i.e., the size or a distance required to pass through the cell B).

As for examples of the statistical processing, for example, summary statistics, test of normality, binomial test, t test, variance analysis, ratio test, correlation analysis, regression analysis, multivariate analysis, or survival time analysis can be used.

Further, as an example alteration of the above-described step 3, elements constituting the input function 851 and the output function 855 are selected from the base stations 100 of Category 1, Category 2, and Category 3. Most of the base stations 100 to which the wireless terminal 400 is connected are assumed to belong to the base stations of Category 1, Category 2, and Category 3, thus, communication delay between the input function 851 or output function 855 and the wireless terminal 400 can be decreased.

As another example alteration of step 3, elements constituting the distribution function 802, the computing function 803, and the aggregate function 804 are selected from servers of Category 6, Category 7, and Category 8. These categories include, for example, a third base station (e.g., the base station 100-3) that has never accepted a handover from a first base station (e.g., the base station 100-1) or an apparatus other than base stations (e.g., the server 175 of the upper node 300). As such, the base station 100 of these categories is unlikely to be a handover target of the wireless terminal 400 and other wireless terminals that are connected to the base station 100-1. As such, a server of the base station 100 selected from the above-described categories is characterized in being not easily affected by handover processing, and the server can execute processing in a stable manner.

As still another example alteration of step 3, in selection of a server to which an element constituting a processing function is assigned, the server is determined taking into account of response time of communication with another server to which an element constituting a processing function adjacent to said processing function (e.g., a processing function that is executed immediately before or after said processing function in the processing flow) is assigned. For example, a server is selected so that response time of communication is short. The response time of communication between servers can be obtained from the second table 222.

When classifying base stations 100 and constructing the virtual machine 600 based on the result of the statistical processing, the server can perform processing with predefined determination criteria. For example, the processing can be performed with the following determination criteria.
Selection of elements and initial configuration of a virtual machine (element assignment) with which reconstruction of the virtual machine 600 is needed less often even when the wireless terminal 400 performs a handover.
Construction of a virtual machine with faster processing capability (or, conversely, construction of a virtual machine with slower processing capability) as the movement speed of the wireless terminal 400 is higher.
Construction of a virtual machine (element assignment) that is not easily affected by movement or application processing of other wireless terminals.
Construction of a virtual machine (element assignment) such that variation of server loads and variation in resource usage are small by using servers of the base stations 100 within a certain area.

Further, the configuration of the virtual machine 600 may be changed depending on an application program performed by the wireless terminal 400. For example, when an application program that is tolerant to relatively longer processing delay is executed, the server may perform an operation for changing the configuration of the virtual machine 600 to replace an element of a server with high resource usage to an element of a server with low resource usage. An application program that is tolerant to relatively longer processing delay can be identified by predefined identification information or the like. More specifically, when the application program is relatively tolerant to processing delay (when the application program is more tolerant to processing delay than other application programs, or when a predetermined or predefined processing delay is acceptable to the application program), at least a part of the functions of a virtual machine is assigned to the base station 100 with relatively large response time of communication with other base stations. For example, a part of the above-described functions is assigned to the base station of which response time is not less than predetermined time or predefined time. Meanwhile, when the application program is relatively not tolerant to processing delay (when the application program is less tolerant to processing delay than other application programs, or when a predetermined or predefined processing delay is not acceptable to the application program), at least a part of the functions of a virtual machine is assigned to a base station 100 with relatively small response time of communication with other base stations. For example, a part of the above-described functions is assigned to the base station of which response time is not more than predetermined time or predefined time.

For example, when a data amount processed by the application program increases or time for ending processing is required to be shortened, the server may add an element to the virtual machine 600 and synchronize elements to improve performance of the virtual machine 600.

Descriptions have been given above of the example embodiments of the present invention. However, the present invention is not limited to these example embodiments. It should be understood by those of ordinary skill in the art that these example embodiments are merely examples and that various alterations are possible without departing from the scope and the spirit of the present invention.

An apparatus including constituent elements of the base station described in the Specification (e.g., the first communication processing unit, the second communication processing unit, and/or the server function unit) (e.g., one or more apparatuses (or units) among a plurality of apparatuses (or units) constituting the base station or a module for one of the plurality of apparatuses (or units)) may be provided. An apparatus including the constituent elements of the wireless terminal described in the Specification (e.g., the communication processing unit and/or the application program processing unit) (e.g., a module for the wireless terminal) may be provided. An apparatus including the constituent elements of the upper node described in the Specification (e.g., the communication processing unit and/or the server function unit) (e.g., a module for the upper node) may be provided. An apparatus including the constituent elements of the database apparatus described in the Specification (e.g., the communication processing unit and/or the database management unit) (e.g., a module for the database apparatus) may be provided. Moreover, methods including processing of the constituent elements may be provided, and programs (or program products) for causing one or more processors to execute processing of the constituent elements may be provided. Moreover, a non-transitory computer-readable recording medium (non-transitory computer readable medium) having recorded thereon the programs may be provided. It is apparent that such apparatuses, methods, programs, and a non-transitory computer-readable recording medium are also included in the scope of the present invention.

The whole or part of the example embodiments disclosed above can be described as, but not limited to, the following supplementary notes.

(Supplementary Note 1)

A base station system comprising:

a plurality of base stations configured to execute assigned functions each being a part of a plurality of functions of a virtual machine executing an application program for a wireless terminal apparatus, the plurality of functions of the virtual machine being distributedly executed by the plurality of base stations.

(Supplementary Note 2)

The base station system according to Supplementary Note 1 further comprising:

a database configured to store history information of handovers among the plurality of base stations, the history information including a history of a handover of the wireless terminal apparatus, wherein at least a part of the plurality of functions of the virtual machine is at least assigned to a first base station to which the wireless terminal apparatus is connected and to a second base station that has ever accepted a handover from the first base station, based on the history information of handovers stored in the database.

(Supplementary Note 3)

The base station system according to Supplementary Note 1 or 2, wherein assignment of the functions of the virtual machine to the plurality of base stations is changed.

(Supplementary Note 4)

The base station system according to any one of Supplementary Notes 1 to 3, wherein, when the wireless terminal apparatus performs a handover, assignment of the functions of the virtual machine to the plurality of base stations is changed.

(Supplementary Note 5)

The base station system according to any one of Supplementary Notes 1 to 4, further comprising:

a database configured to store response time of communication among the plurality of base stations, wherein in a case where the application program is relatively tolerant to processing delay, at least a part of the functions of the virtual machine is assigned to a base station having relatively large response time of communication with other base stations, and in a case where the application program is not relatively tolerant to processing delay, at least a part of the functions of the virtual machine is assigned to a base station having relatively small response time of communication with other base stations.

(Supplementary Note 6)

The base station system according to Supplementary Note 2, wherein an input function and/or an output function out of the plurality of functions of the virtual machine are at least assigned to the first base station to which the wireless terminal apparatus is connected and to the second base station that has ever accepted a handover from the first base station among the plurality of base stations.

(Supplementary Note 7)

The base station system according to any one of Supplementary Notes 1 to 6, further comprising:

a database configured to store history information of handovers among the plurality of base stations, the history information including a history of a handover of the wireless terminal apparatus, wherein a computing function out of the plurality of functions of the virtual machine is at least assigned to a third base station that has not accepted a handover from the first base station to which the wireless terminal apparatus is connected among the plurality of base stations or assigned to an apparatus other than the base stations.

(Supplementary Note 8)

The base station system according to any one of Supplementary Notes 1 to 7, further comprising:

a node apparatus located in a radio access network, the plurality of functions of the virtual machine being distributedly executed by the plurality of base stations and the node apparatus.

(Supplementary Note 9)

A node apparatus comprising:

a server function unit configured to distributedly assign, to a plurality of base stations, a plurality of functions of a virtual machine executing an application program for a wireless terminal apparatus, wherein the plurality of functions of the virtual machine are assigned to the plurality of base stations, at least based on history information of handovers among the plurality of base stations.

(Supplementary Note 10)

A method comprising:

distributedly assigning, to a plurality of base stations, a plurality of functions of a virtual machine executing an application program for a wireless terminal apparatus, and executing, by the plurality of base stations, the assigned functions.

(Supplementary Note 11)

The method according to Supplementary Note 10, wherein the plurality of functions of the virtual machine are assigned to the plurality of base stations, at least based on history information of handovers among the plurality of base stations.

(Supplementary Note 12)

A program causing a computer to execute:

distributedly assigning, to a plurality of base stations, a plurality of functions of a virtual machine executing an application program for a wireless terminal apparatus; and executing, by the plurality of base stations, the assigned functions.

(Supplementary Note 13)

The program according to Supplementary Note 12, wherein the plurality of functions of the virtual machine are assigned to the plurality of base stations at least based on history information of handovers among the plurality of base stations.

(Supplementary Note 14)

A computer-readable recording medium having recorded thereon a program causing a computer to execute:

distributedly assigning, to a plurality of base stations, a plurality of functions of a virtual machine executing an application program for a wireless terminal apparatus; and executing, by the plurality of base stations, the assigned functions.

(Supplementary Note 15)

The computer-readable recording medium according to Supplementary Note 14, having recorded thereon the program causing a computer to execute:

assigning the plurality of functions of the virtual machine to the plurality of base stations, at least based on history information of handovers among the plurality of base stations.

(Supplementary Note 16)

A communication system comprising:

a plurality of network apparatuses configured to execute assigned functions each being a part of a plurality of functions of a virtual machine executing an application program for a wireless terminal apparatus, the plurality of functions of the virtual machine being distributedly executed by the plurality of network apparatuses.

(Supplementary Note 17)

The communication system according to Supplementary Note 16, wherein the network apparatuses includes a base station or a server associated with a base station.

(Supplementary Note 18)

The communication system according to Supplementary Note 16 or 17, wherein the network apparatuses includes an upper node apparatus of a base station.

This application claims priority based on Japanese Patent Application No. 2018-038477 filed on Mar. 5, 2018, the entire disclosure of which is incorporated herein.

According to the present invention, a wireless terminal can execute an application program by using resources of other apparatuses.

What is claimed is:

1. A base station system comprising:

a plurality of base stations configured to execute assigned functions each being a part of a plurality of functions of a virtual machine executing an application program for a wireless terminal apparatus; and a database configured to store response time of communication among the plurality of base stations, wherein the plurality of functions of the virtual machine being distributedly executed by the plurality of base stations, in a case where the application program is relatively tolerant to processing delay, at least a part of the functions of the virtual machine is assigned to a base station having relatively large response time of communication with other base stations, and in a case where the application program is not relatively tolerant to processing delay, at least a part of the functions of the virtual machine is assigned to a base station having relatively small response time of communication with other base stations.

2. The base station system according to claim 1 further comprising:

a database configured to store history information of handovers among the plurality of base stations, the history information including a history of a handover of the wireless terminal apparatus, wherein at least a part of the plurality of functions of the virtual machine is at least assigned to a first base station to which the wireless terminal apparatus is connected and to a second base station that has ever accepted a handover from the first base station, based on the history information of handovers stored in the database.

3. The base station system according to claim 1, wherein assignment of the functions of the virtual machine to the plurality of base stations is changed.

4. The base station system according to claim 1, wherein, when the wireless terminal apparatus performs a handover, assignment of the functions of the virtual machine to the plurality of base stations is changed.

5. The base station system according to claim 2, wherein an input function and/or an output function out of the plurality of functions of the virtual machine are at least assigned to the first base station to which the wireless terminal apparatus is connected and to the second base station that has ever accepted a handover from the first base station among the plurality of base stations.

6. The base station system according to claim 1, further comprising:

a database configured to store history information of handovers among the plurality of base stations, the history information including a history of a handover of the wireless terminal apparatus, wherein a computing function out of the plurality of functions of the virtual machine is at least assigned to a third base station that has not accepted a handover from the first base station to which the wireless terminal apparatus is connected among the plurality of base stations or assigned to an apparatus other than the base stations.

7. The base station system according to claim 1, further comprising:
a node apparatus located in a radio access network,
the plurality of functions of the virtual machine being distributedly executed by the plurality of base stations and the node apparatus.

8. A node apparatus comprising:
a memory storing instructions; and
one or more processors configured to execute the instructions to
distributedly assign, to a plurality of base stations, a plurality of functions of a virtual machine executing an application program for a wireless terminal apparatus,
wherein the plurality of functions of the virtual machine are assigned to the plurality of base stations, at least based on history information of handovers among the plurality of base stations and history information of response time of communication among the plurality of base stations,
in a case where the application program is relatively tolerant to processing delay, at least a part of the functions of the virtual machine is assigned to a base station having relatively large response time of communication with other base stations, and
in a case where the application program is not relatively tolerant to processing delay, at least a part of the functions of the virtual machine is assigned to a base station having relatively small response time of communication with other base stations.

9. A method comprising:
distributedly assigning, to a plurality of base stations, a plurality of functions of a virtual machine executing an application program for a wireless terminal apparatus based on history information of response time of communication among the plurality of base stations, and
executing, by the plurality of base stations, the assigned functions, wherein
in a case where the application program is relatively tolerant to processing delay, at least part of the functions of the virtual machine is assigned to a base station having relatively large response time of communication with other base stations, and
in a case where the application program is not relatively tolerant to processing delay, at least a part of the functions of the virtual machine is assigned to a base station having relatively small response time of communication with other base stations.

10. The method according to claim 9, wherein the plurality of functions of the virtual machine are assigned to the plurality of base stations, at least based on history information of handovers among the plurality of base stations.

* * * * *